US011031231B2

(12) United States Patent
Pringle et al.

(10) Patent No.: US 11,031,231 B2
(45) Date of Patent: Jun. 8, 2021

(54) MASS SPECTROMETRY IMAGING WITH AUTOMATIC PARAMETER VARYING IN ION SOURCE TO CONTROL CHARGED DROPLET SPRAYING

(71) Applicant: MICROMASS UK LIMITED, Wilmslow (GB)

(72) Inventors: Steven Derek Pringle, Darwen (GB); Emrys Jones, Manchester (GB); Stephen O'Brien, Manchester (GB); Anthony Hesse, Heald Green (GB); Mike Morris, Glossop (GB); Zoltan Takats, Haslingfield (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 16/306,834

(22) PCT Filed: Jun. 5, 2017

(86) PCT No.: PCT/GB2017/051616
§ 371 (c)(1),
(2) Date: Dec. 3, 2018

(87) PCT Pub. No.: WO2017/208030
PCT Pub. Date: Dec. 7, 2017

(65) Prior Publication Data

US 2019/0295834 A1 Sep. 26, 2019

(30) Foreign Application Priority Data

Jun. 3, 2016 (GB) ..................................... 1609743

(51) Int. Cl.
*H01J 49/16* (2006.01)
*G01N 1/40* (2006.01)
*H01J 49/14* (2006.01)

(52) U.S. Cl.
CPC ............ *H01J 49/167* (2013.01); *G01N 1/405* (2013.01); *H01J 49/142* (2013.01); *H01J 49/165* (2013.01); *G01N 2001/4038* (2013.01)

(58) Field of Classification Search
None
See application file for complete search history.

(56) References Cited

U.S. PATENT DOCUMENTS 7,655,476 B2 2/2010 Bui
2004/0173743 A1* 9/2004 Valaskovic ........... B05B 12/082 250/288
(Continued)

FOREIGN PATENT DOCUMENTS

CN 102332387 A 1/2012
CN 102741965 A 10/2012
(Continued)

OTHER PUBLICATIONS

Green et al., Developing Repeatable Measurements for Reliable Analysis of Molecules at Surfaces Using Desorption Electrospray Ionization, 81 Anal. Chem. 2286 (2009) (Year: 2009).*
(Continued)

*Primary Examiner* — James Choi
(74) *Attorney, Agent, or Firm* — Kacvinsky Daisak Bluni PLLC

(57) ABSTRACT

There is provided an apparatus comprising a first ion source (10) arranged and adapted to emit a spray of charged droplets (11), and a control system arranged and adapted to control one or more spatial properties of said spray of charged droplets (11) in use by automatically varying or adjusting one or more parameters of said first ion source.

19 Claims, 10 Drawing Sheets

(56) References Cited

U.S. PATENT DOCUMENTS

| | | | | |
|---|---|---|---|---|
| 2007/0141719 | A1 | 6/2007 | Bui | |
| 2008/0017793 | A1 | 1/2008 | James et al. | |
| 2010/0078550 | A1* | 4/2010 | Wiseman | G01N 1/405 250/282 |
| 2014/0316717 | A1 | 10/2014 | Ikegami et al. | |
| 2016/0155620 | A1 | 6/2016 | Makarov | |
| 2017/0221687 | A1 | 8/2017 | Stauber et al. | |
| 2017/0368205 | A1 | 12/2017 | Zarrine-Afsar et al. | |
| 2018/0366313 | A1 | 12/2018 | Hoyes et al. | |

FOREIGN PATENT DOCUMENTS

| | | | |
|---|---|---|---|
| JP | H1048183 | A | 2/1998 |
| WO | 2002095362 | A2 | 11/2002 |

OTHER PUBLICATIONS

Andre Venter, Droplet Dynamics and Ionization Mechanisms in Desorption Electrospray Ionization Mass Spectrometry, Anal. Chem. 2006, 78, 8549-8555 (Year: 2006).*

International Search Report and Written Opinion for International Application No. PCT/GB2017/051616, dated Aug. 9, 2017, 14 pages.

Search Report under Section 17(5) for United Kingdom Application No. GB1609743.8, dated Nov. 7, 2016, 6 pages.

Green et al., "Developing Repeatable Measurements for Reliable Analysis of Molecules at Surfaces Using Desorption Electrospray Ionization", Analytical Chemistry, 81(6): 2286-2293, Mar. 15, 2009.

Wood et al., "Microscopic Imaging of Glass Surfaces under the Effects of Desorption Electrospray Ionization", Analytical Chemistry, 81(15): 6407-6415, Jul. 9, 2009.

International Search Report and Written Opinion for International Application No. PCT/GB2017/051604, dated Aug. 17, 2017, 16 pages.

Search Report under Section 17(5) for United Kingdom Patent Application No. GB1609747.9, dated Nov. 9, 2016, 12 pages.

Claude et al., "Multiple, Sequential DESI Images from a Single Tissue Section at Different Spatial Resolution", Feb. 2015, URL:http://www.waters.com/waters/library.htmlocale=en GB lid=134833822 cid=511436, retrieved from the Internet on Jul. 7, 2016.

Takats et al., "Ambient Mass Spectrometry Using Desorption Electrospray Ionization (DESI): Instrumentation, Mechanisms and Applications in Forensics, Chemistry, and Biology", Journal of Mass Spectrometry, 40(10):1261-1275, Oct. 1, 2005.

Claude et al.,"Generation of Multiple Images from a Single Tissue Section with Dual Polarity Desorption Electrospray Ionization Mass Spectrometry", Mar. 18, 2015, URL:http://maldi-msi.org/wp/wp-content/uploads/2015/03/DESI-Generation%20of'/o20multiple%20images.pdf, retrieved from the Internet on Jul. 27, 2017.

Campbell et al.,"Improved Spatial Resolution in the Imaging of Biological Tissue Using Desorption Electrospray Ionization", Analytical and Bioanalytical Chemistry, 404(2):389-398, Jun. 16, 2012.

Takats et al, "Mass Spectrometry Sampling Under Ambient Conditions with Desorption Electrospray Ionization", Science, 306, pp. 471-473, Oct. 15, 2004.

Ifa et al., "Tissue Imprint Imaging by Desorption Electrospray Ionization Mass Spectrometry", Analytical Methods, 2011(3):1910-1912. Jun. 2011.

Muller et al., "Direct Plant Tissue Analysis and Imprint Imaging by Desorption Electrospray Ionization Mass Spectrometry", Analytical Chemistry, 2011(83): 5754-5761.

* cited by examiner

MASS SPECTROMETRY IMAGING WITH AUTOMATIC PARAMETER VARYING IN ION SOURCE TO CONTROL CHARGED DROPLET SPRAYING

CROSS-REFERENCE TO RELATED APPLICATIONS

This application is a national phase filing claiming the benefit of and priority to International Patent Application No. PCT/GB2017/051616, filed on Jun. 5, 2017, which claims priority from and the benefit of United Kingdom patent application No. 1609743.8 filed on Jun. 3, 2016. The entire contents of these applications are incorporated herein by reference.

FIELD OF THE INVENTION

The present invention relates generally to the analysis or imaging of a target or sample by ambient ionisation techniques such as desorption electrospray ionisation ("DESI"), methods of analysis, imaging and diagnosis and apparatus for analysing or imaging a target or sample using an ambient ionisation ion source.

Various embodiments are contemplated wherein analyte ions generated by an ambient ionisation ion source are then subjected either to: (i) mass analysis by a mass analyser such as a quadrupole mass analyser or a Time of Flight mass analyser; (ii) ion mobility analysis (IMS) and/or differential ion mobility analysis (DMA) and/or Field Asymmetric Ion Mobility Spectrometry (FAIMS) analysis; and/or (iii) a combination of firstly ion mobility analysis (IMS) and/or differential ion mobility analysis (DMA) and/or Field Asymmetric Ion Mobility Spectrometry (FAIMS) analysis followed by secondly mass analysis by a mass analyser such as a quadrupole mass analyser or a Time of Flight mass analyser (or vice versa).

Various embodiments also relate to an ion mobility spectrometer and/or mass analyser and a method of ion mobility spectrometry and/or method of mass analysis.

BACKGROUND

A number of different ambient ionisation ion sources are known. Ambient ionisation ion sources are characterised by the ability to generate analyte ions from a native or unmodified target.

For example, desorption electrospray ionisation ("DESI") is an ambient ionisation technique that allows direct and fast analysis of surfaces without the need for prior sample preparation. Reference is made to Z. Takats et al., Science 2004, 306, 471-473 which discloses performing mass spectrometry sampling under ambient conditions using a desorption electrospray ionisation ("DESI") ion source.

Various compounds were ionised including peptides and proteins present on metal, polymer and mineral surfaces. Desorption electrospray ionization ("DESI") was carried out by directing an electrosprayed spray of (primary) charged droplets and ions of solvent onto the surface to be analysed. The impact of the charged droplets on the surface produces gaseous ions of material originally present on the surface. Subsequent splashed (secondary) droplets carrying desorbed analyte ions are directed toward an atmospheric pressure interface of a mass and/or ion mobility spectrometer or analyser via a transfer capillary.

The resulting mass spectra are similar to normal electrospray mass spectra in that they show mainly singly or multiply charged molecular ions of the analytes. The desorption electrospray ionisation phenomenon was observed both in the case of conductive and insulator surfaces and for compounds ranging from nonpolar small molecules such as lycopene, the alkaloid coniceine, and small drugs, through polar compounds such as peptides and proteins. Changes in the solution that is sprayed can be used to selectively desorb and ionise particular compounds, including those in biological matrices. In vivo analysis was also demonstrated.

It is known that ambient ionisation ion sources such as desorption electrospray ionization ("DESI") may be used to image a sample (e.g. a tissue section). In ambient ionisation mass spectrometry imaging, the spatial distribution of the composition of a sample is visualised by analysing ions produced from multiple spatially separated regions of the sample.

A pre-built model of biomarkers may be used to identify different tissue structures and different types of tissue in a sample. For example, it is known to classify tissue type based upon a previously acquired multivariate statistical model.

Ambient ionisation mass spectrometry imaging systems can suffer from problems due to instability and variability, and may require complex optimisation procedures. This is undesirable and hinders the routine deployment of ambient ionisation mass spectrometry imaging systems.

F. Green et al., "Developing repeatable measurements for reliable analysis of molecules at surfaces using desorption electrospray ionization", Anal. Chem. 2009, 2286-2293 discloses a study of desorption electrospray ionisation ("DESI").

M. Wood et al., "Microscopic Imaging of Glass Surfaces under the Effects of Desorption Electrospray Ionization", Anal. Chem. 2009, 6407-6415 discloses microscopic imaging techniques in desorption electrospray ionisation ("DESI").

It is therefore desired to provide an improved ambient ionisation ion source.

SUMMARY

According to an aspect of the disclosure there is provided an apparatus comprising a first ion source arranged and adapted to emit a spray of charged droplets, and a control system arranged and adapted to control one or more spatial properties of the spray of charged droplets in use by automatically varying or adjusting one or more parameters of the first ion source.

According to various embodiments the apparatus provides an improved control of the spatial properties of the spray of charged droplets, by automatically varying or adjusting one or more parameters of the first ion source.

For example, if a spatial property of the spray of charged droplets changes significantly in use (e.g., a cross-sectional area of the spray becomes too large), the control system may be configured to control this (e.g., during an acquisition) by automatically varying or adjusting one or more parameters of the first ion source to bring the spatial property to within a predefined range (e.g., reduce the cross-sectional area of the spray back to its original or a desired value).

In an alternative example, that could still be combined with the above example, the control system may be configured to provide a desired value of a spatial property of the spray of charged droplets (e.g., a desired cross-sectional area value, for example corresponding to a pixel size of a particular sample) automatically as part of a calibration routine.

F. Green et al., "Developing repeatable measurements for reliable analysis of molecules at surfaces using desorption electrospray ionization", Anal. Chem. 2009, 2286-2293 discloses a study of the various parameters that affect the sensitivity and rate of material consumption with desorption electrospray ionisation ("DESI"). However, the paper does not disclose or suggest automatically varying or adjusting one or more parameters of an ion source (e.g., in use or as part of a calibration routine) to control one or more spatial properties of a spray of charged droplets. M. Wood et al., "Microscopic Imaging of Glass Surfaces under the Effects of Desorption Electrospray Ionization", Anal. Chem. 2009, 6407-6415 also fails to disclose or suggest these features of the present disclosure.

The first ion source may comprise a desorption electrospray ionisation ("DESI") ion source or a desorption electroflow focusing ("DEFFI") ion source.

The control system may be configured to determine a suitable value of the one or more spatial properties, measure the value of the one or more spatial properties throughout the acquisition, and adjust or vary the one or more parameters of the first ion source during the acquisition if the measured value of the one or more spatial properties differs from the suitable value by a given amount.

The control system may be arranged and adapted to automatically vary or adjust the one or more parameters of the first ion source, in real time and/or during the acquisition, such that the spray of charged droplets transitions from having a first value of the one or more spatial properties to having a second, different value of the one or more spatial properties, wherein the second value corresponds to the determined suitable value.

Alternatively, or additionally, the control system may be arranged and adapted to:

determine a value of the one or more parameters of the first ion source that achieves a desired spatial property; and automatically vary or adjust the one or more parameters of the first ion source until the value of the one or more parameters corresponds to the determined value so as to control one or more spatial properties of the spray of charged droplets.

The step of determining a value of the one or more parameters of the first ion source that achieves a desired spatial property comprises:

varying the one or more parameters between a plurality of different parameter values and recording a value of the one or more spatial properties at each parameter value; and determining which of the plurality of different parameter values corresponds to or achieves the desired spatial property.

The control system may be arranged and adapted to carry out the step of determining a value of the one or more parameters of the first ion source that achieves a desired spatial property as part of a calibration routine.

The first ion source may comprise a gas nozzle and a liquid (e.g., solvent) emitter extending through the gas nozzle, wherein, in use, gas exits the gas nozzle around the liquid emitter to nebulise liquid emerging from the liquid emitter.

The one or more parameters of the first ion source may comprise a position of the liquid emitter with respect to the gas nozzle.

The apparatus may further comprise one or more actuators arranged and adapted to vary or adjust a mechanical parameter of the first ion source to control the one or more spatial properties of the spray of charged droplets.

The control system may be arranged and adapted:

to conduct a survey scan of a sample and identify one or more regions of interest of the sample, wherein during the survey scan the one or more parameters of the ion source are adjusted such that the spray of charged droplets has a relatively large cross-sectional area; and to conduct an analytical scan of the regions of interest, wherein during the analytical scan the one or more parameters of the ion source are adjusted such that the spray of charged droplets has a relatively small cross-sectional area.

According to an aspect of the disclosure there is provided a mass spectrometer and/or an ion mobility spectrometer comprising an apparatus as described above.

According to an aspect of the disclosure there is provided a method comprising:

using a first ion source to emit a spray of charged droplets; and controlling one or more spatial properties of the spray of charged droplets by automatically varying or adjusting one or more parameters of the first ion source.

The method may further comprise:

determining a suitable value of the one or more spatial properties;

measuring the value of the one or more spatial properties throughout an acquisition; and adjusting or varying the one or more parameters of the first ion source during the acquisition if the measured value of the one or more spatial properties differs from the suitable value by a given amount.

Alternatively, or additionally, the method may further comprise:

determining a value of the one or more parameters of the first ion source that achieves a desired spatial property; and automatically varying or adjusting the one or more parameters of the first ion source until the value of the one or more parameters corresponds to the determined value so as to control one or more spatial properties of the spray of charged droplets.

The method may further comprise:

conducting a survey scan of a sample and identifying one or more regions of interest of the sample, and adjusting the one or more parameters of the ion source during the survey scan such that the spray of charged droplets has a relatively large cross-sectional area; and conducting an analytical scan of the regions of interest, and adjusting the one or more parameters of the ion source during the analytical scan such that the spray of charged droplets has a relatively small cross-sectional area.

According to an aspect of the disclosure there is provided a method of mass spectrometry and/or ion mobility spectrometry comprising a method as described above.

According to an aspect of the disclosure there is provided an apparatus comprising:

a first ion source arranged and adapted to emit a spray of charged droplets; and a control system arranged and adapted to control one or more spatial properties of the spray of charged droplets in use by varying or adjusting one or more parameters of the first ion source.

Various embodiments disclosed herein can lead to improvements in data quality, since the spatial properties of the spray of charged droplets can be set by a user (e.g., using the control system) to match the experiment at hand, by varying or adjusting (e.g., automatically) one or more parameters of the first ion source. The one or more parameters may be instrumental parameters, such as mechanical or operational parameters.

The control system may be configured to determine (e.g., predetermine) a suitable value of the one or more spatial properties (e.g., prior to an acquisition), measure the value of the one or more spatial properties throughout the acquisition, and adjust or vary (e.g., automatically and/or in real time and/or repeatedly and/or continuously) the one or more parameters of the first ion source during the acquisition if the measured value of the one or more spatial properties differs from the suitable value by a given amount.

This leads to a controlled and/or automated variation in the spot size (or other spatial property) of the spray of charged droplets, which is distinct from conventional studies into the effect of varying or adjusting one or more parameters of an ambient ion source on spot size and other spatial properties of the spray of charged droplets emerging therefrom.

Variation or adjustment of the parameter may cause an effect, directly or indirectly in one or more spatial properties of the spray of charged droplets.

In any of the aspects or embodiments described above and herein, the one or more spatial properties may be a spatial characteristic or feature of or exhibited by the spray.

The one or more spatial properties may comprise one or more of the geometry, profile, cross-sectional profile, area, cross-sectional area, shape, symmetry, diameter, circumference, width, flow pattern or flow field of the spray of charged droplets.

The control system may be arranged and adapted to vary or adjust the one or more parameters of the first ion source such that the spray of charged droplets is able to transition from having a first cross-sectional area to having a second, different cross-sectional area.

The one or more spatial properties may comprise one or more of spray spot size or shape. The control system may be arranged and adapted to control the spray spot size or shape by varying or adjusting the one or more parameters of the first ion source in use.

The control system may be arranged and adapted to:

determine a value of the one or more parameters of the first ion source that achieves a desired spatial property; and vary or adjust the one or more parameters of the first ion source until the value of the one or more parameters corresponds to the determined value so as to control one or more spatial properties of the spray of charged droplets in use.

The desired spatial property may comprise a desired geometry, profile, cross-sectional profile, area, cross-sectional area, shape, symmetry, diameter, circumference, width, flow pattern, flow field, spray spot size or shape of the spray of charged droplets.

Determining a value of the one or more parameters of the first ion source that achieves a desired spatial property may comprise varying the one or more parameters between a plurality of different parameter values and recording a spatial property (e.g., corresponding to the desired spatial property) of the spray of charged droplets at each parameter value. A table of the different parameter values and their recorded spatial property could be constructed.

Determining a value of the one or more parameters of the first ion source that corresponds to or achieves the desired spatial property may comprise determining which of the plurality of different parameter values corresponds to or achieves the desired spatial property.

For example, the desired spatial property may be a desired cross-sectional area of the spray of charged droplets, and the one or more parameters could be varied between upper and lower limits, wherein the cross-sectional area may be recorded at each parameter value. A table of the different parameter values and their associated cross-sectional area could be drawn up.

The parameter value that corresponds to or achieves the desired cross-sectional area could be determined, e.g., from the table, and the one or more parameters could be varied or adjusted until the value of the one or more parameters corresponds to the determined value.

The control system may be arranged and adapted to carry out the step of determining a value of the one or more parameters of the first ion source that achieves a desired spatial property as part of a non-analytical or calibration routine, and/or prior to an analytical or experimental routine.

The one or more parameters may comprise a flow rate or pressure of the spray of charged droplets.

The first ion source may be arranged and adapted to emit the spray of charged droplets by nebulising a flow of liquid, for example solvent. The first ion source may comprise a source of nebulising gas for nebulising the flow of liquid.

The one or more parameters of the first ion source may comprise a flow rate or pressure of the nebulising gas and/or liquid.

The control system may be arranged and adapted to control a flow pattern, spray spot size or shape of the spray of charged droplets by varying or adjusting the flow rate or pressure of the nebulising gas.

In a first mode of operation the control system may be arranged and adapted to adjust the flow rate or pressure of the nebulising gas to provide a first flow pattern, spray spot size or shape of the spray of charged droplets.

In a second mode of operation the control system is arranged and adapted to adjust the flow rate or pressure of the nebulising gas to provide a second, different flow pattern, spray spot size or shape of the spray of charged droplets.

The first flow pattern may be a centripetal flow pattern. The second flow pattern may be a centrifugal flow pattern.

A flow pattern may be considered to be centrifugal if the flow (e.g., the flow of the spray of charged droplets) is typically away from a centre or stagnation point.

A flow pattern may be considered to be centripetal if the flow (e.g., the flow of the spray of charged droplets) is typically towards a centre or stagnation point, and optionally further if a stagnation line is defined, wherein the flow is typically towards the centre point when moving towards the centre point from the stagnation line, and typically away from the centre point when moving away from the centre point from the stagnation line. The stagnation line may be a substantially circular line centered on or around the centre or stagnation point.

In use, the centripetal flow pattern may lead to a relatively small spray spot size, and the centrifugal flow pattern may lead to a relatively large spray spot size.

The first ion source may comprise a gas nozzle and a liquid (e.g., solvent) emitter extending through the gas nozzle, wherein, in use, gas may exit the gas nozzle around the liquid emitter to nebulise liquid emerging from the liquid emitter.

The one or more parameters of the first ion source may comprise a position of the liquid emitter with respect to the gas nozzle. The one or more parameters of the first ion source may comprise a distance that the liquid emitter protrudes from the gas nozzle.

The position or distance may be adjustable such that adjustment of the position or distance is or can be used to control the one or more spatial properties of the spray of charged droplets.

The apparatus may further comprise one or more actuators arranged and adapted to vary or adjust a mechanical parameter of the first ion source to control the one or more spatial properties of the spray of charged droplets.

The one or more spatial properties of the spray of charged droplets may comprise an absolute position, relative position or offset position of the spray of charged droplets.

The mechanical parameter of the first ion source may comprises a position of one or more nozzles or emitters for emitting at least a portion of the spray of charged droplets.

The one or more actuators may be arranged and adapted to move the one or more nozzles or emitters to control the one or more spatial properties of the spray of charged droplets.

The apparatus may further comprise a sampling stage arranged and adapted to receive a sample.

The control system may be arranged and adapted to:

determine a value of the one or more parameters of the first ion source, e.g., a flow rate or pressure of the nebulising gas and/or solvent, that achieves a desired spray spot size or shape of the spray of charged droplets on the sampling stage or sample; and vary or adjust the one or more parameters of the first ion source until the value of the one or more parameters corresponds to the determined value so as to control the spray spot size or shape of the spray of charged droplets on the sampling stage or sample in use.

The sample may be divided into a number of pixels, each having substantially the same pixel size. The desired spray spot size or shape may correspond to a sampling area/shape or pixel size, for example associated with the sampling stage or sample. The desired spray spot size may be less than the sampling area or pixel size and/or within about ±1%, ±2%, ±3%, ±4%, ±5%, ±6%, ±7%, ±8%, ±9%, ±10%, ±15%, ±20%, ±30%, ±40% or ±50% of the sampling area or pixel size.

Determining a value of the one or more parameters of the first ion source that achieves a desired spray spot size or shape may comprise varying the one or more parameters between a plurality of different parameter values and recording a spray spot size or shape of the spray of charged droplets at each parameter value. A table of the different parameter values and their recorded spray spot size or shape could be constructed.

Determining a value of the one or more parameters of the first ion source that corresponds to or achieves the desired spray spot size or shape may comprise determining which of the plurality of different parameter values corresponds to or achieves the desired spray spot size or shape.

The parameter value that corresponds to or achieves the desired spray spot size or shape area could be determined, e.g., from the table, and the one or more parameters could be varied or adjusted until the value of the one or more parameters corresponds to the determined value.

The control system may be arranged and adapted to carry out the step of determining a value of the one or more parameters of the first ion source that achieves a desired spray spot size or shape as part of a non-analytical or calibration routine, and/or prior to an analytical or experimental routine.

The apparatus may further comprise a device arranged and adapted to direct the spray of charged droplets at a sample received by the sampling stage. The device may comprise, or be the first ion source.

The apparatus may further comprise one or more actuators arranged and adapted to adjust a position of the device relative to the sample and/or sampling stage to control one or more spatial properties of the spray of charged droplets.

The control system may be arranged and adapted:

to conduct a survey scan of a or the sample and identify one or more regions of interest of the sample, wherein during the survey scan the one or more parameters of the ion source are adjusted such that the spray of charged droplets has a relatively large cross-sectional area (or spray spot size on the sample); and to conduct an analytical scan of the regions of interest, wherein during the analytical scan the one or more parameters of the ion source are adjusted such that the spray of charged droplets has a relatively small cross-sectional area (or spray spot size on the sample).

According to an aspect of the disclosure there is provided an apparatus comprising:

a first ion source arranged and adapted to emit a spray of charged droplets;

a gas nozzle and a liquid (e.g., solvent) emitter (e.g., a solvent capillary referred to herein) extending through and protruding from the gas nozzle, wherein, in use, gas exits the gas nozzle around the liquid emitter to nebulise liquid emerging from the liquid emitter and produce the spray of charged droplets;

wherein the liquid emitter is held within the gas nozzle such that the liquid emitter is centralised with respect to the gas nozzle, and/or wherein the liquid emitter and the gas nozzle are coaxial with one another.

Reference to the gas nozzle may be a reference to an outlet, aperture or orifice thereof, wherein in use gas exits the gas nozzle via the outlet, aperture or orifice.

The apparatus may further comprise a support member (e.g., a centering disc referred to herein) arranged and adapted to fit within the gas nozzle. The support member may comprise an aperture centralised with respect to the gas nozzle. The liquid emitter may pass through the aperture. An interference fit may exist between the support member and the liquid emitter.

The apparatus may further comprise a tubular member (e.g., a capillary support referred to herein) comprising an elongated portion (e.g., the second portion of the capillary support referred to herein) centralised with respect to the gas nozzle. The liquid emitter may pass through the elongated portion. An interference fit may exist between the elongated portion of the tubular member and the liquid emitter.

The liquid emitter may be held within the gas nozzle (e.g., by the support member or the tubular member) such that the radial distance or gap between the liquid emitter and the gas nozzle is substantially constant around a circumference of the liquid emitter.

The first ion source may comprise or form part of an ambient ion or ionisation source.

The first ion source may comprise a desorption electrospray ionisation ("DESI") ion source or a desorption electroflow focusing ("DEFFI") ion source.

According to an aspect of the disclosure there is provided an ambient ionisation ion source comprising an apparatus as described above.

According to an aspect of the disclosure there is provided a desorption electrospray ionisation ("DESI") imaging system comprising an apparatus as described above.

According to an aspect of the disclosure there is provided a desorption electroflow focusing ionisation ("DEFFI") imaging system comprising an apparatus as described above.

According to an aspect of the disclosure there is provided an ion imager comprising an apparatus as described above.

According to an aspect of the disclosure there is provided an analysis apparatus comprising an apparatus as described above.

According to an aspect of the disclosure there is provided a mass spectrometer and/or an ion mobility spectrometer comprising an apparatus as described above.

According to an aspect of the disclosure there is provided a method comprising:

using a first ion source to emit a spray of charged droplets; and controlling one or more spatial properties of the spray of charged droplets by varying or adjusting one or more parameters of the first ion source.

The one or more spatial properties may comprise one or more of the geometry, profile, cross-sectional profile, area, cross-sectional area, shape, symmetry, diameter, circumference, width, flow pattern or flow field of the spray of charged droplets.

The method may further comprise varying or adjusting the one or more parameters of the first ion source such that the spray of charged droplets transitions from having a first cross-sectional area to having a second, different cross-sectional area.

The one or more spatial properties may comprise one or more of spray spot size or shape.

The method may further comprise:

determining a value of the one or more parameters of the first ion source that achieves a desired spatial property; and varying or adjusting the one or more parameters of the first ion source until the value of the one or more parameters corresponds to the determined value so as to control one or more spatial properties of the spray of charged droplets.

The step of determining a value of the one or more parameters may comprise varying the one or more parameters between a plurality of different parameter values and recording a spatial property of the spray of charged droplets at each parameter value.

The step of determining a value of the one or more parameters may comprise determining which of the plurality of different parameter values corresponds to or achieves the desired spatial property.

The step of determining a value of the one or more parameters may be carried out as part of a calibration routine.

The one or more parameters may comprise a flow rate or pressure of the spray of charged droplets.

The method may further comprise emitting the spray of charged droplets by nebulising a flow of liquid, for example solvent. The method may further comprise nebulising the flow of liquid using a nebulising gas.

The one or more parameters of the first ion source may comprise a flow rate or pressure of the nebulising gas.

The method may further comprise controlling a flow pattern, spray spot size or shape of the spray of charged droplets by varying or adjusting the flow rate or pressure of the nebulising gas.

The method may further comprise:

in a first mode of operation adjusting the flow rate or pressure of the nebulising gas to provide a first flow pattern, spray spot size or shape of the spray of charged droplets; and in a second mode of operation adjusting the flow rate or pressure of the nebulising gas to provide a second, different flow pattern, spray spot size or shape of the spray of charged droplets.

The first flow pattern may be a centripetal flow pattern, and the second flow pattern may be a centrifugal flow pattern.

The centripetal flow pattern may lead to a relatively small spray spot size, and the centrifugal flow pattern may lead to a relatively large spray spot size.

The first ion source may comprise a gas nozzle and a liquid (e.g., solvent) emitter extending through the gas nozzle, and the method may further comprise passing gas exiting the gas nozzle around the liquid emitter to nebulise liquid emerging from the liquid emitter.

The one or more parameters of the first ion source may comprise a position of the liquid emitter with respect to the gas nozzle.

The one or more parameters of the first ion source may comprise a distance that the liquid emitter protrudes from the gas nozzle.

The position or distance may be adjustable and the method may further comprise adjusting the position or distance to control the one or more spatial properties of the spray of charged droplets.

The method may further comprise varying or adjusting a mechanical parameter of the first ion source to control the one or more spatial properties of the spray of charged droplets.

The one or more spatial properties of the spray of charged droplets may comprise an absolute position, relative position or offset position of the spray of charged droplets.

The mechanical parameter of the first ion source may comprise a position of one or more nozzles or emitters for emitting at least a portion of the spray of charged droplets.

The method may further comprise moving the one or more nozzles or emitters to control the one or more spatial properties of the spray of charged droplets.

The method may further comprise providing a sampling stage to receive a sample.

The method may further comprise using a device to direct the spray of charged droplets at a sample received by the sampling stage.

The method may further comprise adjusting a position of the device relative to the sample and/or sampling stage to control one or more spatial properties of the spray of charged droplets.

The method may further comprise:

conducting a survey scan of a sample and identifying one or more regions of interest of the sample, and adjusting the one or more parameters of the ion source during the survey scan such that the spray of charged droplets has a relatively large cross-sectional area; and conducting an analytical scan of the regions of interest, and adjusting the one or more parameters of the ion source during the analytical scan such that the spray of charged droplets has a relatively small cross-sectional area.

According to an aspect of the disclosure there is provided a method comprising:

using a first ion source to emit a spray of charged droplets;

providing a gas nozzle and a liquid (e.g., solvent) emitter extending through and protruding from the gas nozzle, and the method further comprises passing gas exiting the gas nozzle around the liquid emitter to nebulise liquid emerging from the liquid emitter and produce the spray of charged droplets; and holding the liquid emitter within the gas nozzle such that the liquid emitter is centralised with respect to the gas nozzle.

The method may further comprise providing a support member arranged and adapted to fit within the gas nozzle, wherein the support member comprises an aperture centralised with respect to the gas nozzle, the liquid emitter passes through the aperture, and an interference fit exists between the support member and the liquid emitter.

The method may further comprise providing a tubular member comprising an elongated portion centralised with respect to the gas nozzle, wherein the liquid emitter passes through the elongated portion and an interference fit exists between the elongated portion of the tubular member and the liquid emitter.

The liquid emitter may be held within the gas nozzle (e.g., by the support member or the tubular member) such that the radial distance between the liquid emitter and the gas nozzle is substantially constant around a circumference of the liquid emitter.

The first ion source may comprise or form part of an ambient ion or ionisation source.

According to an aspect of the disclosure there is provided a method as described above, wherein the first ion source comprises a desorption electrospray ionisation ("DESI") ion source or a desorption electro-flow focusing ("DEFFI") ion source.

According to an aspect of the disclosure there is provided a method of ambient ionisation comprising a method as described above.

According to an aspect of the disclosure there is provided a method of desorption electrospray ionisation ("DESI") imaging comprising a method as described above.

According to an aspect of the disclosure there is provided a method of desorption electroflow focusing ionisation ("DEFFI") imaging comprising a method as described above.

According to an aspect of the disclosure there is provided a method of ion imaging comprising a method as described above.

According to an aspect of the disclosure there is provided a method of analysis comprising a method as described above.

According to an aspect of the disclosure there is provided a method of surgery, diagnosis, therapy or medical treatment comprising a method as described above.

According to an aspect of the disclosure there is provided a non-surgical, non-therapeutic method of mass spectrometry and/or ion mobility spectrometry comprising a method as described above.

According to an aspect of the disclosure there is provided a method of mass spectrometry and/or ion mobility spectrometry comprising a method as described above.

BRIEF DESCRIPTION OF THE DRAWINGS

Various embodiments will now be described, by way of example only, and with reference to the accompanying drawings in which.

DETAILED DESCRIPTION

Figure 1:
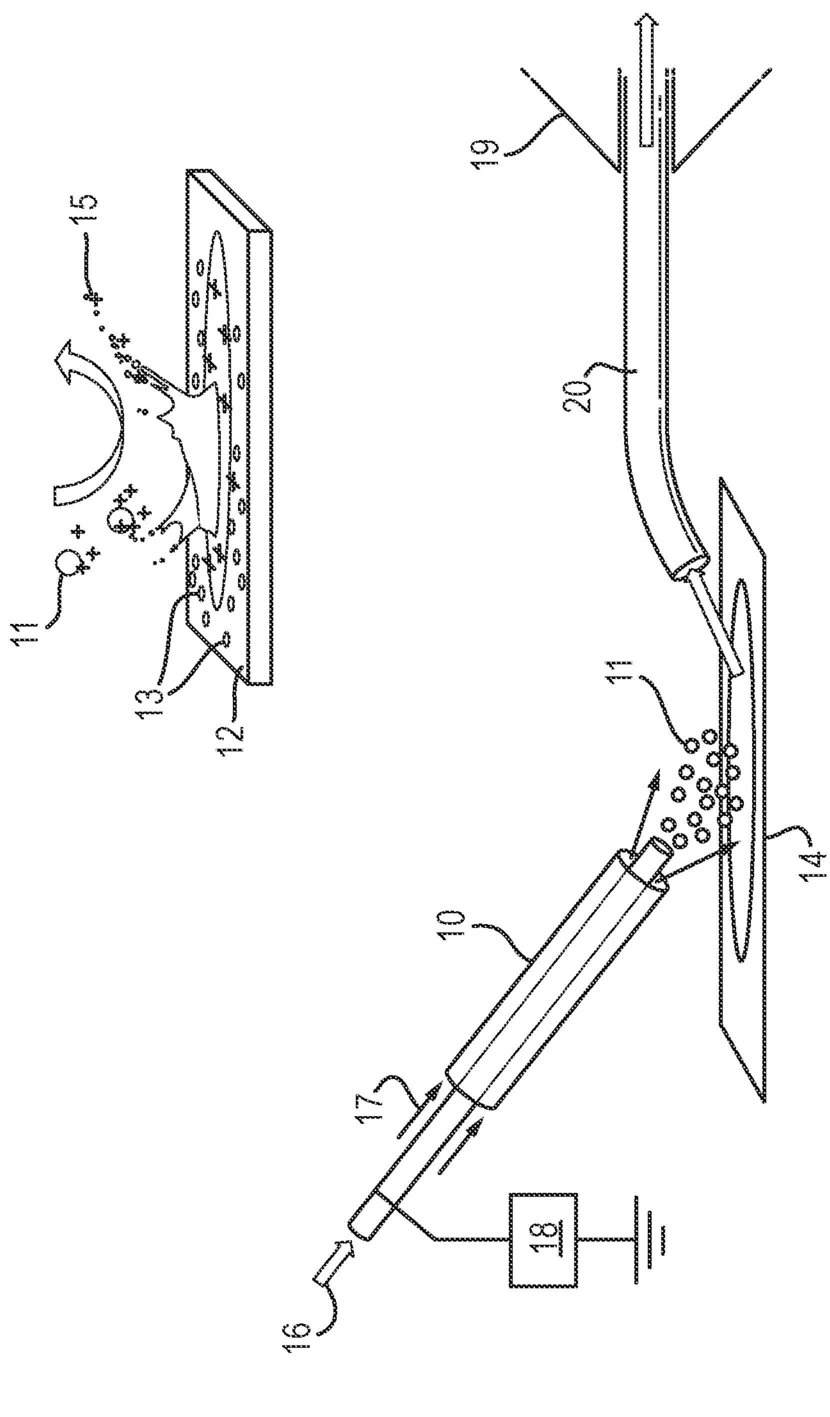
FIG. 1 illustrates schematically the desorption electrospray ionisation ("DESI") technique.

Various embodiments are directed to methods of and apparatus for ambient ionisation mass spectrometry imaging wherein an ambient ionisation ion source emits a spray of charged droplets.

According to various embodiments a device may be used to generate analyte ions from one or more regions of a target or sample (e.g., ex vivo tissue). The device may comprise an ambient ionisation ion source which is characterised by the ability to analyse a native or unmodified target or sample. For example, other types of ionisation ion sources such as Matrix Assisted Laser Desorption Ionisation ("MALDI") ion sources require a matrix or reagent to be added to the sample prior to ionisation.

It will be apparent that the requirement to add a matrix or a reagent to a sample prevents the ability to perform in vivo analysis of tissue and also, more generally, prevents the ability to provide a rapid simple analysis of target material.

In contrast, therefore, ambient ionisation techniques are particularly advantageous since firstly they do not require the addition of a matrix or a reagent (and hence are suitable for the analysis of in vivo tissue) and since secondly they enable a rapid simple analysis of target material to be performed.

A number of different ambient ionisation techniques are known. As a matter of historical record, desorption electrospray ionisation ("DESI") was the first ambient ionisation technique to be developed and was disclosed in 2004. Since 2004, a number of other ambient ionisation techniques have been developed. These ambient ionisation techniques differ in their precise ionisation method but they share the same general capability of generating gas-phase ions directly from native (i.e. untreated or unmodified) samples. A particular advantage of the various ambient ionisation techniques is that the various ambient ionisation techniques do not require any prior sample preparation. As a result, the various ambient ionisation techniques enable both in vivo tissue and ex vivo tissue samples to be analysed without necessitating the time and expense of adding a matrix or reagent to the tissue sample or other target material.

A list of ambient ionisation techniques is given in the following table:

| Acronym | Ionisation technique |
|---|---|
| DESI | Desorption electrospray ionization |
| DeSSI | Desorption sonic spray ionization |
| DAPPI | Desorption atmospheric pressure photoionization |
| EASI | Easy ambient sonic-spray ionization |
| JeDI | Jet desorption electrospray ionization |
| TM-DESI | Transmission mode desorption electrospray ionization |
| LMJ-SSP | Liquid microjunction-surface sampling probe |
| DICE | Desorption ionization by charge exchange |
| Nano-DESI | Nanospray desorption electrospray ionization |
| EADESI | Electrode-assisted desorption electrospray ionization |
| APTDCI | Atmospheric pressure thermal desorption chemical ionization |
| V-EASI | Venturi easy ambient sonic-spray ionization |
| AFAI | Air flow-assisted ionization |
| LESA | Liquid extraction surface analysis |
| PTC-ESI | Pipette tip column electrospray ionization |
| AFADESI | Air flow-assisted desorption electrospray ionization |
| DEFFI | Desorption electro-flow focusing ionization |
| ESTASI | Electrostatic spray ionization |
| PASIT | Plasma-based ambient sampling ionization transmission |
| DAPCI | Desorption atmospheric pressure chemical ionization |
| DART | Direct analysis in real time |
| ASAP | Atmospheric pressure solid analysis probe |
| APTDI | Atmospheric pressure thermal desorption ionization |
| PADI | Plasma assisted desorption ionization |
| DBDI | Dielectric barrier discharge ionization |
| FAPA | Flowing atmospheric pressure afterglow |
| HAPGDI | Helium atmospheric pressure glow discharge ionization |
| APGDDI | Atmospheric pressure glow discharge desorption ionization |
| LTP | Low temperature plasma |
| LS-APGD | Liquid sampling-atmospheric pressure glow discharge |
| MIPDI | Microwave induced plasma desorption ionization |
| MFGDP | Microfabricated glow discharge plasma |
| RoPPI | Robotic plasma probe ionization |
| PLASI | Plasma spray ionization |
| MALDESI | Matrix assisted laser desorption electrospray ionization |
| ELDI | Electrospray laser desorption ionization |
| LDTD | Laser diode thermal desorption |
| LAESI | Laser ablation electrospray ionization |
| CALDI | Charge assisted laser desorption ionization |
| LA-FAPA | Laser ablation flowing atmospheric pressure afterglow |
| LADESI | Laser assisted desorption electrospray ionization |
| LDESI | Laser desorption electrospray ionization |
| LEMS | Laser electrospray mass spectrometry |
| LSI | Laser spray ionization |
| IR-LAMICI | Infrared laser ablation metastable induced chemical ionization |
| LDSPI | Laser desorption spray post-ionization |
| PAMLDI | Plasma assisted multiwavelength laser desorption ionization |
| HALDI | High voltage-assisted laser desorption ionization |
| PALDI | Plasma assisted laser desorption ionization |
| ESSI | Extractive electrospray ionization |
| PESI | Probe electrospray ionization |
| ND-ESSI | Neutral desorption extractive electrospray ionization |
| PS | Paper spray |
| DIP-APCI | Direct inlet probe-atmospheric pressure chemical ionization |

-continued

| Acronym | Ionisation technique |
|---|---|
| TS | Touch spray |
| Wooden-tip | Wooden-tip electrospray |
| CBS-SPME | Coated blade spray solid phase microextraction |
| TSI | Tissue spray ionization |
| RADIO | Radiofrequency acoustic desorption ionization |
| LIAD-ESI | Laser induced acoustic desorption electrospray ionization |
| SAWN | Surface acoustic wave nebulization |
| UASI | Ultrasonication-assisted spray ionization |
| SPA-nanoESI | Solid probe assisted nanoelectrospray ionization |
| PAUSI | Paper assisted ultrasonic spray ionization |
| DPESI | Direct probe electrospray ionization |
| ESA-Py | Electrospray assisted pyrolysis ionization |
| APPIS | Ambient pressure pyroelectric ion source |
| RASTIR | Remote analyte sampling transport and ionization relay |
| SACI | Surface activated chemical ionization |
| DEMI | Desorption electrospray metastable-induced ionization |
| REIMS | Rapid evaporative ionization mass spectrometry |
| SPAM | Single particle aerosol mass spectrometry |
| TDAMS | Thermal desorption-based ambient mass spectrometry |
| MAII | Matrix assisted inlet ionization |
| SAII | Solvent assisted inlet ionization |
| SwiFERR | Switched ferroelectric plasma ionizer |
| LPTD | Leidenfrost phenomenon assisted thermal desorption |

According to an embodiment the ambient ionisation ion source may comprise a desorption electrospray ionisation ("DESI") ion source.

However, it will be appreciated that other ambient ion sources including those referred to above that emit a spray of charged droplets may also be utilised. For example, according to another embodiment the ambient ionisation ion source may comprise a desorption electro-flow focusing ("DEFFI") ion source.

Desorption electrospray ionisation ("DESI") allows direct and fast analysis of surfaces without the need for prior sample preparation. Biological compounds such as lipids, metabolites and peptides may be ionised at atmospheric pressure and analysed in their native state without requiring any advance sample preparation. The technique according to various embodiments will now be described in more detail with reference to FIG. 1.

As shown in FIG. 1, the desorption electrospray ionisation ("DESI") technique is an ambient ionisation method that involves directing a spray of (primary) electrically charged droplets 11 onto a surface 12 with analyte 13 present on the surface 12 and/or directly onto a surface of a sample 14. The electrospray mist is pneumatically directed at the sample by a sprayer 10 (e.g. a first ion source) where subsequent splashed (secondary) droplets 15 carry desorbed ionised analytes (e.g. desorbed lipid ions). The sprayer 10 may be supplied with a solvent 16, a nebulising gas 17 such as nitrogen, and voltage from a high voltage ("HV") source 18. After ionisation, the ions may travel through air into an atmospheric pressure interface 19 of a mass spectrometer or mass analyser (not shown), e.g. via a transfer capillary 20. The ions may then be analysed to determine their mass to charge ratio and/or ion mobility, or to determine the mass to charge ratio and/or ion mobility of ions derived from the initial ions (e.g. by fragmenting the initial ions), etc.

Desorption electroflow focusing ionisation ("DEFFI") is a recently developed ambient ionisation technique, in which an electroFlow Focusing (RTM) nebuliser is used to desorb ions from a sample surface. This nebuliser focusses the emitted electrospray through a small orifice in a grounded plate using a concentric gas flow. Unlike desorption electrospray ionisation ("DESI"), which may use very high nebulising gas pressures (e.g., 100 psi) and high electrospray voltages (e.g., 4.5 to 5 kV), desorption electroflow focusing ionisation ("DEFFI") has so far been operated at relatively low gas pressures (e.g., 10 psi) and lower voltages (e.g., 500 V), as higher voltages were reported to cause droplet discharge at the orifice and corona discharge.

Desorption electrospray ionisation ("DESI") is of particular interest in the context of imaging mass spectrometry, since it can be used to analyse a sample (e.g. tissue section) whilst leaving it virtually unaltered. Accordingly, a particular benefit of utilising desorption electrospray ionisation ("DESI") to analyse or image a sample (e.g. tissue section) in accordance with various embodiments is that desorption electrospray ionisation ("DESI") analysis allows for multiple interrogations of the same part of the sample (tissue section). This is not the case with many other types of ionisation, such as Matrix-Assisted Laser Desorption Ionisation ("MALDI").

Desorption electrospray ionisation ("DESI") is a versatile ionisation technique for mass spectrometry for surfaces under ambient conditions, and does not require a sample to be under vacuum or cooled, nor does it require time consuming sample preparation steps.

Ambient ionisation mass spectrometry imaging systems (such as desorption electrospray ionisation ("DESI") imaging systems) can, however, suffer from problems due to instability and variability. For example, variations in instrumental and/or environmental parameters or properties may affect the diagnostic abilities of the imaging system.

These effects may impact the diagnostic quality of the imaging system and the sensitivity and specificity of an analysis, and may prevent the routine deployment of ambient ionisation mass spectrometry imaging systems into e.g., histopathology laboratories in a diagnostic manner.

Furthermore, ambient ionisation mass spectrometry imaging systems may require complex optimisation procedures which may be time consuming and require user input. This may be undesirable in routine deployment due to, for example, cost.

Various embodiments described herein are directed to an apparatus comprising a first ion source 10 that emits a spray of charged droplets 11, such as a desorption electrospray ionisation ("DESI") ion source. A detector or sensor is arranged to detect, sense or determine one or more parameters or properties of the spray of charged droplets 11. The detector or sensor may be arranged to automatically detect, sense or determine the one or more parameters or properties of the spray of charged droplets 11.

The first ion source 10 may comprise an ambient ionisation ion source, such as a desorption electrospray ionization ("DESI") ion source or a desorption electro-flow focusing ("DEFFI") ion source. In various embodiments, the first ion source 10 may comprise a solvent emitter, and a device for supplying a solvent to the solvent emitter may be provided. The first ion source 10 may further comprise a nozzle having an aperture. A device for supplying a nebulising gas within the nozzle may be provided so that the nebulising gas exits the nozzle via the aperture. The solvent emitter may extend through the aperture.

The approach according to various embodiments aids the routine deployment of ambient ionisation imaging systems (such as desorption electrospray ionization ("DESI") imaging systems) into e.g., a histopathology laboratory in a diagnostic manner. Critical parameters that may affect the diagnostic abilities of the imaging system may be validated, automatically optimised or checked prior to data collection and also post data collection.

For example, one critical parameter in mass spectrometry imaging is the ionisation spot size, i.e., the size of each of multiple spatially separated regions of a sample from which ions are analysed. In desorption electrospray ionisation ("DESI") ionisation and imaging, a number of important parameters relate to the quality and diagnostic ability due to the spray point or spray spot, e.g., the spray spot size, the analysis area size and the spray spot shape or symmetry.

According to various embodiments, other parameters or properties of the spray of charged droplets may include: one or more spatial parameters or properties, such as one or more parameters related to the geometry, profile, cross-sectional profile, area, cross-sectional area, shape, symmetry, diameter, circumference, width or spot size of the spray of charged droplets; one or more calibration parameters or properties, such as one or more parameters related to the absolute position, relative position or offset position of the spray of charged droplets; and/or one or more diagnostic parameters or properties, such as one or more parameters related to the quality, accuracy, variability or reproducibility of the spray of charged droplets.

It will be appreciated that these parameters may impact the diagnostic ability of an imaging system. For example, the spray spot size may affect the imaging resolution—e.g., in a low resolution mode of operation the spray of charged droplets may have a relatively large spot size, while in a high resolution mode of operation the spray of charged droplets may have a relatively small spot size. A control system may, for example, be arranged and adapted to vary or adjust the one or more parameters of said first ion source such that the spray of charged droplets is able to transition from having a first cross-sectional area to having a second, different cross-sectional area.

There are a number of different instrumental parameters which may impact upon or control the desorption electrospray ionisation ("DESI") spray and its parameters or properties such as spot size, shape and position including: (i) the sprayer position; (ii) the height above a sample (e.g., tissue) relative to a sampling orifice or capillary of the mass spectrometer; and (iii) the position (e.g. height and angle) of the sprayer itself relative to the above. Additionally, the solvent flow rate and nebulising gas flow may have an impact. Environmental parameters, such as temperature, pressure and humidity, may also have an effect. The control system may be arranged and adapted to control the spray spot size or shape by varying or adjusting any of the above mentioned parameters of the first ion source 10 in use.

For example, the control system may be arranged and adapted to determine a value of the one or more parameters of the first ion source 10 that achieves a desired spatial property (e.g., spot size or shape), and then vary or adjust the one or more parameters of the first ion source 10 until the value of the one or more parameters corresponds to the determined value, which can be used to control one or more spatial properties (e.g., spot size or shape) of the spray of charged droplets in use.

The one or more parameters may be varied between a plurality of different parameter values and a spatial property of the spray of charged droplets may be recorded at each parameter value. In order to achieve a desired spatial property, the value of the one or more parameters that corresponds to or achieves the desired spatial property may be determined, and the one or more parameters may be varied or adjusted until the value of the one or more parameters corresponds to the determined value as described herein.

The control system may be arranged and adapted to carry out the step of determining a value of the one or more parameters of the first ion source that achieves a desired spatial property as part of a calibration routine, such that during an experimental or analytical run the spatial property (e.g., spot size or shape) can be changed immediately to a desired spatial property by adjusting the one or more parameters to the stored value.

Intended or unintended variations in one or more of the above factors may impact e.g., the spray spot size, shape and position, and the diagnostic abilities of the imaging system.

Figure 2A:
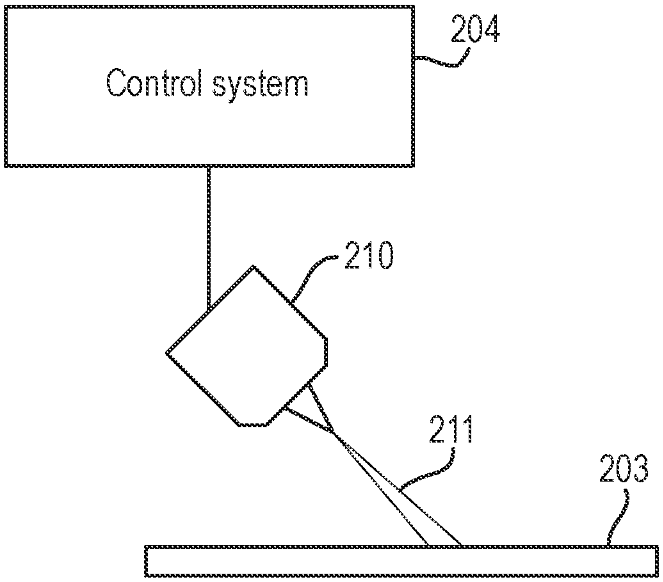
FIG. 2A shows an embodiment in which a spray of charged droplets has a relatively small spot size and FIG. 2B shows an embodiment in which a spray of charged droplets has a relatively large spot size.
Figure 2B:
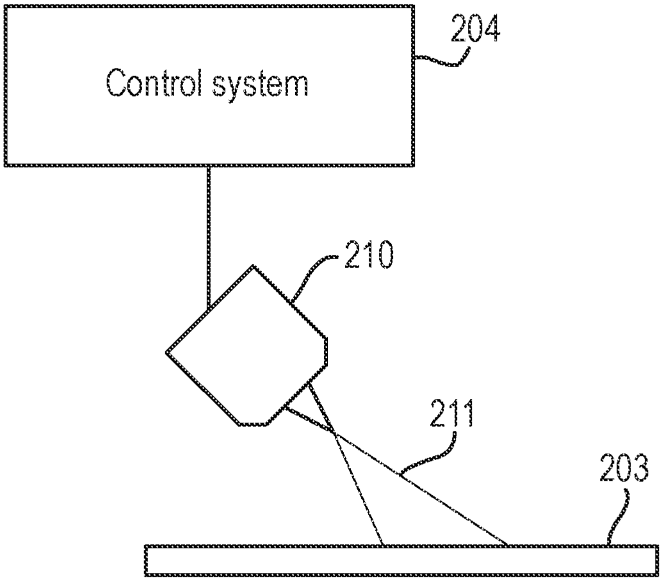

For example, FIGS. 2A and 2B show embodiments in which a first ion source 210 (e.g., a desorption electrospray ionisation ("DESI") ion source) is arranged to emit a spray of charged droplets 211. The first ion source 210 may have a variable spray spot size. Variations in the spray spot size may be intended, e.g., due to a desire from a user to change the spot size, or unintended, e.g., due to environmental and/or instrumental variations. For example, as shown in FIGS. 2A and 2B, the spray 211 may have a relatively small spot size (FIG. 2A) or a relatively large spot size (FIG. 2B) with the spot size being controlled by a control system 204. A detector or sensor 203 may be arranged to determine the spray spot size (or more generally one or more parameters or properties of the spray of charged droplets 211). The detector or sensor 203 may be positioned downstream of the first ion source 210 and spray of charged droplets 211.

The present disclosure may relate to controlled and/or automated variations in the spot size of the spray of charged droplets from an ambient ionisation source, for example a desorption electrospray ionisation ("DESI") ion source.

Mass spectrometry imaging, for example of tissue sections, is typically carried out with the sample divided up into a number of pixels. A typical range of pixel size for a Matrix-Assisted Laser Desorption Ionisation ("MALDI") sample may be between about 10 μm to 250 μm in length (assuming a square pixel). A similar range may be desired for most ambient ionisation techniques such as desorption electrospray ionisation ("DESI").

Figure 3:
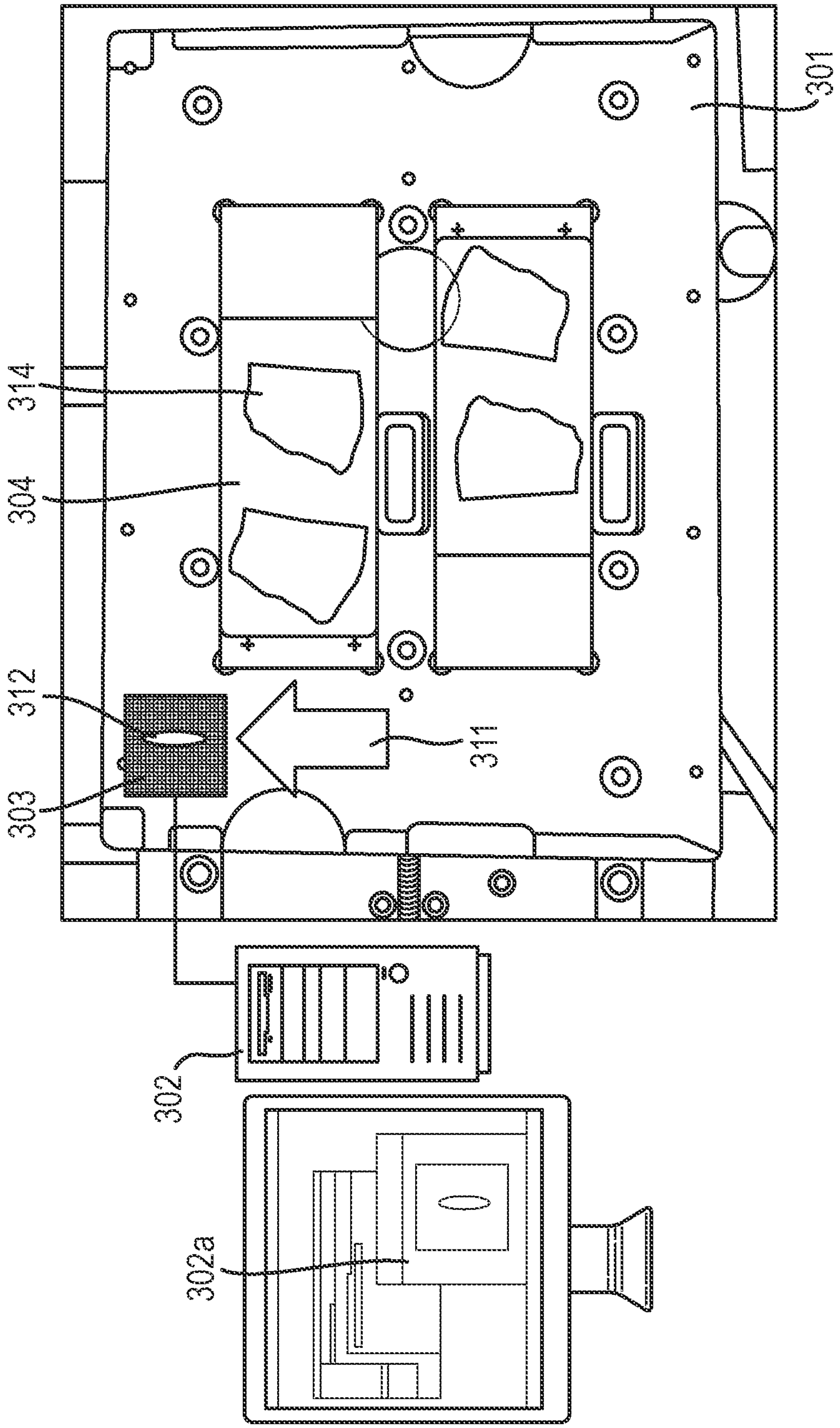
FIG. 3 shows an illustration of the measured region of a sample if a Desorption Electrospray Ionisation ("DESI") spot size is below a given pixel size.

Conventionally, experiments have been carried out at different spatial resolutions, but without the ability to control the spot size of the of the spray as it hits the sample surface. This has been found to lead to poor quality images, for example due to the pixels being smaller than the spot size of the spray on the surface, or conversely, due to the pixels being much larger than the spot size. The latter can lead to a high percentage of available area being unsampled as shown in FIG. 3, which illustrates the area that a spot diameter of roughly a third of the length of the pixel will cover. As is evident, this leads to about a third of the sample being covered.

The disclosure extends to an apparatus comprising a device (e.g., an ion source) for emitting a spray of charged droplets. The device may be arranged and adapted to control one or more properties (e.g., the spot size) of a spray of charged droplets in accordance with various embodiments. This control may be achieved using a control system and/or by varying or adjusting one or more parameters (e.g., instrumental and/or mechanical and/or operational parameters) of the device.

An instrumental parameter may be a parameter related to the device, wherein variation or adjustment of the parameter causes an effect, directly or indirectly in one or more spatial properties of the spray of charged droplets.

A mechanical parameter may correspond to a movement of one or more components (such as a nozzle or emitter) of the first ion source, wherein the movement causes an effect, directly or indirectly in one or more spatial properties of the spray of charged droplets. One or more actuators may be provided to cause said movement, or the movement could be manual, for example caused by an operator.

An operational parameter may be a parameter that corresponds to a transient and/or non-mechanical quantity of the first ion source, such as a flow rate or pressure, wherein variation of the transient or non-mechanical quantity causes an effect, directly or indirectly in one or more spatial properties of the spray of charged droplets.

In various embodiments, the control system may be configured to determine a suitable value of the spot size (or other spatial property) for a given pixel size, measure the value of the spot size (or other spatial property) throughout an experiment or acquisition, and adjust or vary the one or more parameters of the ion source if the measured value of the spot size (or other spatial property) differs from the suitable value by a given amount.

The control of the spot size may be made throughout an experiment or analytical run, for example in real-time and/or continuously. In addition, or alternatively the control of the spot size may be made in response to a determination that the spot size (or other spatial property) should be varied or adjusted, for example due to a value of the spot size (or other spatial property) being outside of a defined range. The defined range may correspond to a range of values of the spot size (or other spatial property) that is suitable for a particular application, for example corresponding to a pixel size or other spatial property of the sample being analysed.

The control of the spot size may be made automatically throughout an experiment or analytical run, for example the control system may be configured to automatically vary or adjust the spot size (or other spatial property) of the spray of charged droplets during an acquisition. For example, if during an acquisition a value of the spot size (or other spatial property) falls outside of a defined range then the control system may automatically change the spot size (or other spatial property) by varying or adjusting the one or more parameters of the ion source.

In various embodiments, a sample may be divided into a number of pixels, each having substantially the same pixel size. The control system may determine a suitable value of the spot size (or other spatial property) to be used when analysing the sample, which suitable value may be based on the pixel size. In some embodiments, the pixel size of the pixels in the sample may vary, and the control system may be configured to determine a suitable value of the spot size (or other spatial property) for each pixel to be used when analysing the sample, which suitable value may be based on the pixel size of each pixel.

During the analysis, or acquisition the control system may determine a current value of the spot size (or other spatial property), for example by measuring this continuously or at regular intervals, and adjust the spot size (or other spatial property) by varying or adjusting the one or more parameters of the ion source if the current value of the spot size (or other spatial property) falls outside a defined range. The adjustment may be such that the value of the spot size (or other spatial property) is brought back into the defined range. The defined range may correspond to a range of values located around the suitable value determined as discussed above, for example within about ±1%, ±2%, ±3%, ±4%, ±5%, ±6%, ±7%, ±8%, ±9%, ±10%, ±15%, ±20%, ±30%, ±40% or ±50% of the suitable value.

Experiments may be conducted that utilise a plurality of samples, each having a different pixel size, and various embodiments extends to imaging each sample sequentially, wherein a suitable value of the spot size (or other spatial property) is determined for each sample, and the spot size (or other spatial property) is adjusted between samples by varying or adjusting the one or more parameters of the ion source.

The spot size (or other spatial property) of the spray of charged droplets may be automatically checked, optimised or tuned (e.g., by varying or adjusting the one or more parameters of the ion source) before and/or after and/or during an acquisition.

The spot size (or other spatial property) may fall outside of the range of suitable values due to unintended or unforeseeable (e.g., environmental and/or instrumental) variations.

The ability to adjust the spot size in real-time, i.e., during an acquisition by varying or adjusting the one or more parameters of the ion source means that ambient ionisation imaging systems (such as those disclosed herein) may be used in a wider variety of applications, for example where such unintended or unforeseeable variations are more common. This builds on the recognition that certain parameters of ambient ionisation imaging systems can be varied in order to change the spatial properties of a spray of charged droplets, for example in ambient ionisation techniques such as desorption electrospray ionisation ("DESI").

Figure 4A:
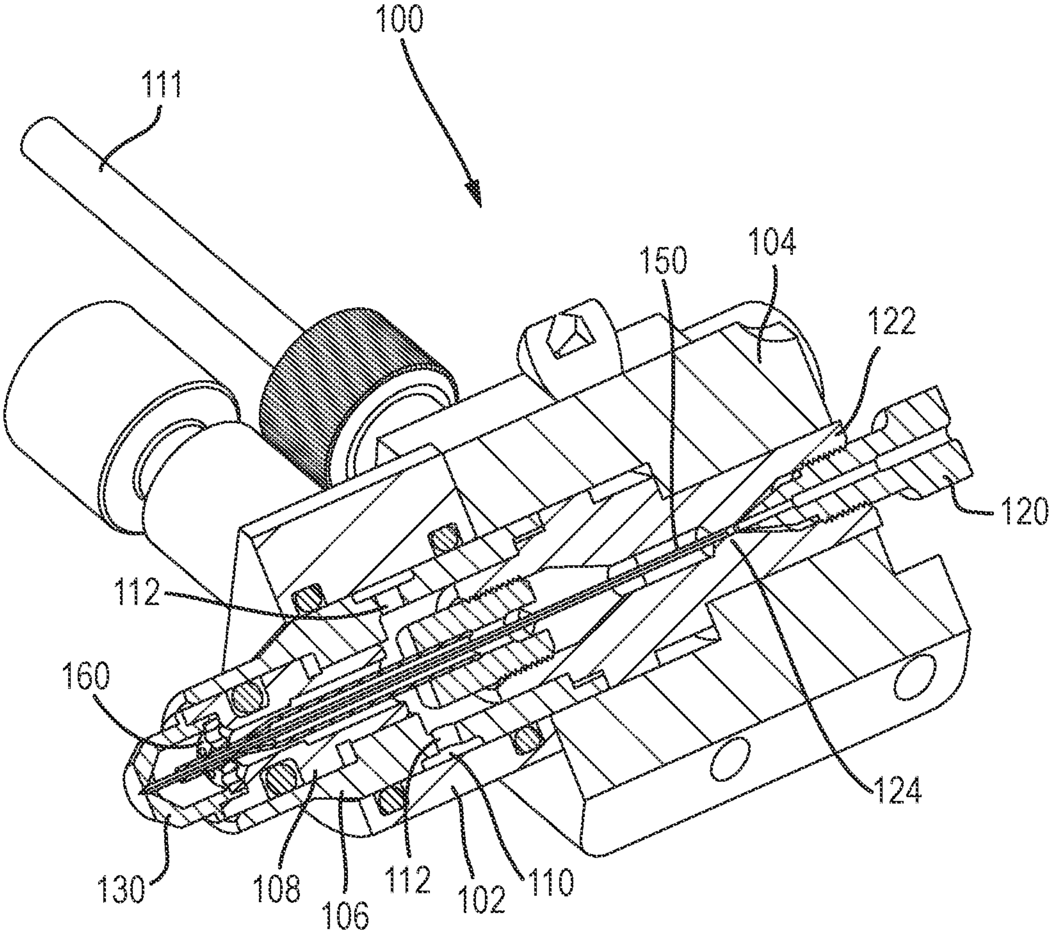
FIG. 4A shows a cross-section of a Desorption Electrospray Ionisation ("DESI") sprayer according to an embodiment.
Figure 4B:
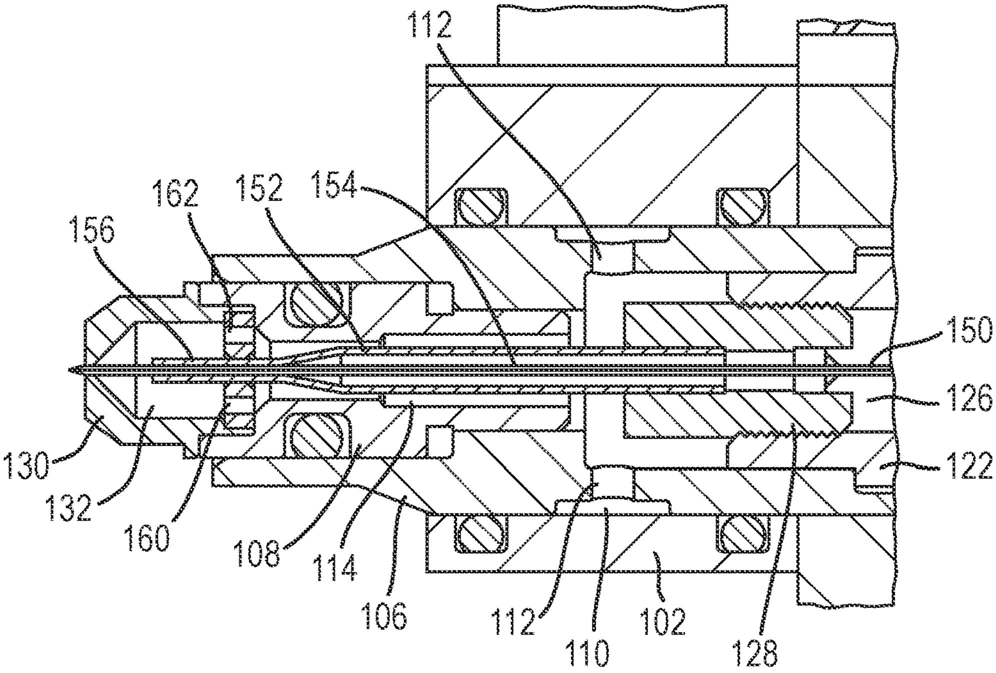
FIG. 4B shows a close up of the Desorption Electrospray Ionisation ("DESI") sprayer of FIG. 4A.
Figure 4C:
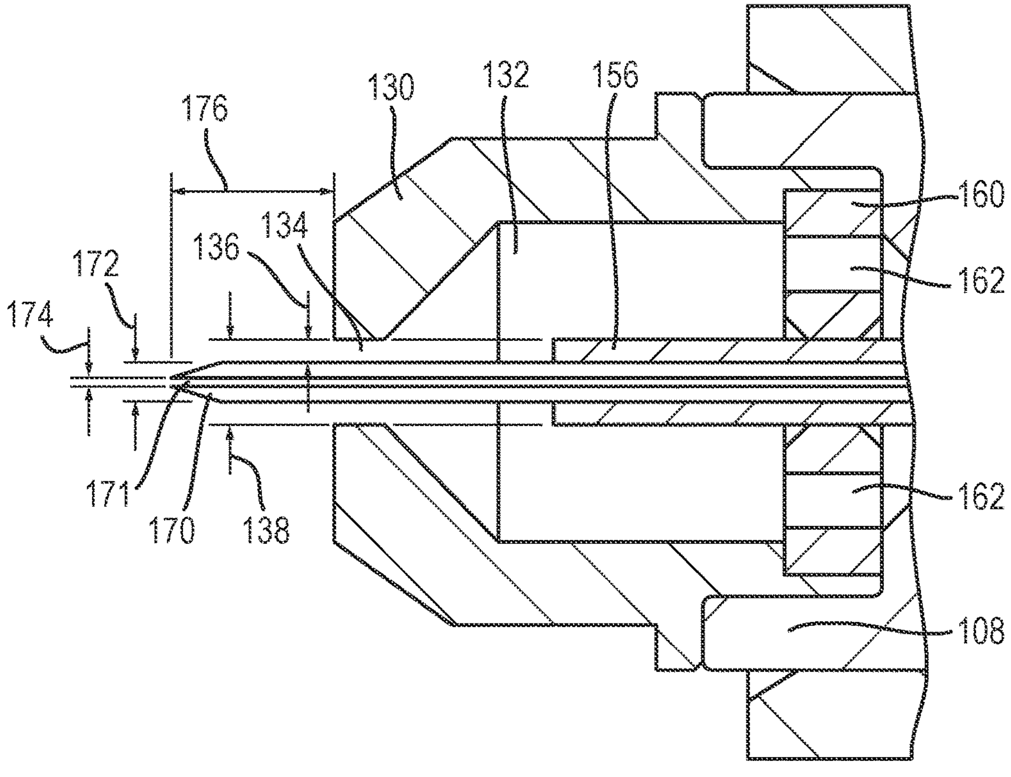
FIG. 4C shows a further close-up of the tip of the Desorption Electrospray Ionisation ("DESI") sprayer of FIGS. 4A and 4B.

FIG. 4A-4C show cross-sections of a device 100 for emitting a spray of charged droplets. The device 100 may be arranged and adapted to control the spot size (or other parameter or property) of a spray of charged droplets.

Generally, the spot size of the spray of charged droplets may be selected from the group consisting of (i)<100 $\mu m^2$; (ii) 100-200 $\mu m^2$; (iii) 200-500 $\mu m^2$; (iv) 500-1000 $\mu m^2$; (v) 1000-2000 $\mu m^2$; (vi) 2000-5000 $\mu m^2$; (vii) 5000-10000 $\mu m^2$; (viii) 10000-20000 $\mu m^2$; (ix) 20000-40000 $\mu m^2$; (x) 40000-60000 $\mu m^2$; (xi) 60000-80000 $\mu m^2$; (xii) 80000-100000 $\mu m^2$; (xiii) 0.1-0.2 $mm^2$; (xiv) 0.2-0.4 $mm^2$; (xv) 0.4-0.6 $mm^2$; (xvi) 0.6-0.8 $mm^2$; (xvii) 0.8-1 $mm^2$; (xviii) 1-1.2 $mm^2$; (xix) 1.2-1.4 $mm^2$; (xx) 1.4-1.6 $mm^2$; (xxi) 1.6-1.8 $mm^2$; (xxii) 1.8-2 $mm^2$; and (xxiii)>2 $mm^2$.

As discussed in more detail below, the variation of a mechanical parameter may be the adjustment of a nozzle (for example an automated adjustment), and the variation of an operational parameter may include increasing or decreasing a flow rate of, e.g., a solvent or nebulising gas. These mechanical and operational parameters may be varied or adjusted automatically, for example using a control system, or manually. The control system may be arranged and adapted to control a flow pattern, spray spot size or shape of the spray of charged droplets by varying or adjusting the flow rate or pressure of the nebulising gas.

The control system may be arranged and adapted to switch between different modes of operation corresponding to different spatial properties. For example, in a first mode of operation the control system may be arranged and adapted to adjust the flow rate or pressure of the nebulising gas to provide a first flow pattern, spray spot size or shape of the spray of charged droplets, and in a second mode of operation the control system may be arranged and adapted to adjust the flow rate or pressure of the nebulising gas to provide a second, different flow pattern, spray spot size or shape of the spray of charged droplets. The first flow pattern may be a centripetal flow pattern, and the second flow pattern may be a centrifugal flow pattern, as defined herein. Typically, it has been found that a centripetal flow pattern can lead to a relatively small spray spot size, and a centrifugal flow pattern can lead to a relatively large spray spot size.

The device 100 may comprise first and second outer housing portions 102, 104 that may be configured to hold various parts of the device 100 in position. The first outer housing portion 102 may surround and hold in position a nozzle housing which may be formed from outer and inner portions 106, 108.

A gas plenum 110 may be provided between the outer portion 106 of the nozzle housing and the first outer housing portion 102. The gas plenum 110 may concentrically surround the outer portion 106 of the nozzle housing and may be fluidly connected to the interior of the nozzle housing via one or more passages 112, so that a gas being passed through the gas plenum 110 and the passages 112 may be emitted from the device 100 as described in more detail below.

The second outer housing portion 104 may surround and hold in position a solvent introduction member 120 and an outer capillary housing 122. The solvent introduction member 120 may be fluidly sealed with the outer capillary housing 122, and may be arranged and adapted to introduce a solvent into the device 100.

A solvent capillary or emitter 150 may be located along the central longitudinal axis of the device 100. The solvent capillary 150 may extend between a first end positioned towards the solvent introduction member 120 and an opposite second, or outlet end 171. The first end of the solvent capillary 150 may be held within an inner flange 124 of the outer capillary housing 122 and may be in fluid communication with the solvent introduction member 120. Capillary spacers 126, 128 may be provided between the outer capillary housing 122 and the solvent capillary 150 in order to maintain the position of the solvent capillary 150 along the central longitudinal axis of the device 100. The solvent capillary 150 may be straight and/or tubular.

In use, solvent may travel through the solvent introduction member 120 and into the solvent capillary 150 through the first end thereof, to be emitted from the opposite second end 171, wherein upon emission from the second end 171 a nebulising gas surrounds and atomises the solvent emerging from a solvent nozzle 170 (see FIG. 4C), as described in more detail below.

A first, gas nozzle 130 may be held by and located at least partially within the inner nozzle housing portion 108. The first nozzle 130 may concentrically surround the solvent capillary 150 and may be tubular so as to define a chamber 132 in its interior. The first nozzle 130 may comprise a gas orifice 134 wherein, in use, nebulising gas may pass through the gas orifice 134 and may be directed towards a target. The nebulising gas may be transferred to the chamber 132 from the gas plenum 110 and then passed through the gas orifice 134. The gas orifice 134 may surround the solvent capillary 150 so that gas emerging from the gas orifice 134 may be emitted concentrically around the solvent capillary 150 so as to nebulise solvent emerging from the solvent capillary 150.

The solvent capillary or emitter 150 may extend through the first nozzle 130, and more specifically the gas orifice 134 thereof.

The device 100 may include a capillary support 152 located around at least a portion of the solvent capillary 150, for example a portion that is positioned concentrically (or radially) within the first nozzle 130. The capillary support 152 may be tubular and comprise a first portion 154 having a relatively large inner diameter. The inner diameter of the first portion 154 may be larger than the outer diameter of the solvent capillary 150, such that the first portion 154 may not contact the solvent capillary 150.

The capillary support 152 may taper to a second portion 156, and the second portion 156 may have an inner diameter substantially equal to the outer diameter of the solvent capillary 150, such that the second portion 156 may contact the solvent capillary 150, for example a portion of the solvent capillary 150 that is positioned concentrically (or radially) within the first nozzle 130. The second portion 156 may be fluidly sealed against the outer surface of the solvent capillary 150, for example by an interference fit.

The second portion 156 of the capillary support 152 may have a length sufficient to prevent substantial vibration of the solvent capillary 150 in use. For example, the second portion 156 may be elongated and/or have a length that is at least 1, 2, 3, 4 or 5 times its largest diameter. The length of the second portion 156 may be equal to, greater than or less than 30 mm, 20 mm, 10 mm or 5 mm.

The device 100 may include a centering disc 160 for holding the solvent capillary 150 in position. The centering disc 160 may be configured (e.g., with the capillary support 152) to hold the solvent capillary 150 centrally, and/or along the central longitudinal axis of the device 100. The centering disc 160 may comprise passages 162 to allow gas to pass therethrough, for example from the gas plenum 110 to the chamber 132 of the first nozzle 130 for subsequent emission from the gas orifice 134.

The centering disc 160 may contact and hold the capillary support 152 in position in addition to (or instead of) the solvent capillary 150, as illustrated in FIGS. 4A-4C. For example, the centering disc 160 may contact the second portion 156 of the capillary support 152. The inner diameter of the centering disc 160 may be substantially equal to the outer diameter of the second portion 156 of the capillary support 152. An interference fit may exist between the centering disc 160 and the capillary support 152 or solvent capillary 150.

The centering disc 160 and/or capillary support 152 can assist in positioning the solvent capillary 150 centrally within the gas orifice 134, for example to ensure a consistent gap 136 between the outer diameter of the solvent capillary 150 and the diameter 138 of the gas orifice 134. Furthermore, the length of the solvent capillary 150 that is unsupported, that is the length of the solvent capillary 150 protruding from the end of the capillary support 152 (see FIG. 4C), is minimised.

The solvent capillary 150 may comprise a second, or solvent nozzle (or solvent emitter) 170, which may be located at its second (or outlet) end 171. The solvent capillary 150 may taper from a relatively large outer diameter 172 along the majority of its length to a relatively small outer diameter 174 at the second end 171. The taper may be less than 50 μm, 40 μm, 30 μm, 20 μm or 10 μm in length. The walls of the solvent capillary 150 at the second end 171 may taper substantially to a point, such that the outer diameter 174 of the solvent capillary 150 at the second end 171 may be equal to its inner diameter.

The outer diameter 172 of the solvent capillary 150 (e.g., along the majority of its length and/or prior to the taper) may be equal to, greater than or less than about 500 μm, 400 μm, 300 μm, 200 μm or 100 μm. The inner diameter 174 of the solvent capillary at the second end 171 may be equal to, greater than or less than 50 μm, 40 μm, 30 μm, 20 μm or 10 μm.

The diameter 138 of the gas orifice 134 may be equal to, greater than or less than about 500 μm, 400 μm or 300 μm. The gap 136 between the gas orifice 134 and the solvent capillary 150 may be equal to, greater than or less than 50 μm, 40 μm, 30 μm, 20 μm or 10 μm.

The solvent capillary 150 may protrude from the first nozzle 130 a distance 176, which distance may be equal to, greater than or less than about 5 mm, 4 mm, 3 mm, 2 mm or 1 mm. The distance 176 that the solvent capillary 150 protrudes from the first nozzle 130 may be adjustable, or controlled electronically by a control system and, for example, an actuator (not shown). This distance 176 may be optimised for a given set of parameters, which may include particular flow rates of solvent and/or gas, or the size of the remaining components (e.g., the gas nozzle 130).

The device 100 may be provided in combination with a supply of nebulising gas (not shown), for example nitrogen. The gas from the gas supply may be transferred to the gas plenum 110 via a gas pipe 111 fluidly connected thereto. The flow rate and/or pressure of the nebulising gas supplied to the device 100 may be controlled, for example using a control system and/or flow control device. In use the gas may flow through the plenum 110 and passages 112 to the chamber 132, via a conduit 114 (between the capillary support 152 and the inner portion 108 of the nozzle housing) and passages 162 in the centering disc 160. The gas may pass through the chamber 132 and output from the device 100 through the gas orifice 134.

As will be described in more detail below, as the gas exits the orifice 134 the flow of gas may be drawn to the surface of the solvent capillary 150. This means that the gas may flow along the outer surface of the solvent capillary 150 and nebulise solvent as it emerges from the second end 171 of the solvent capillary 150.

The device 100 may be provided in combination with a supply of solvent (not shown). The solvent from the solvent supply may be transferred to the solvent capillary 150 via the solvent introduction member 120. The flow rate and/or pressure of the solvent supplied to the device 100 may be adjusted, for example using a or the control system and/or flow control device.

The solvent may be emitted from the device 100 (e.g., from the solvent capillary 150 or second end 171 thereof) at a flow rate selected from the group consisting of: (i)<0.1 μL/min; (ii) 0.1-0.5 μL/min; (iii) 0.5-1 μL/min; (iv) 1-2 μL/min; (v) 2-5 μL/min; (vi) 5-10 μL/min; and (vii)>10 μL/min.

The pressure of the nebulising gas, for example upon entering the device 100 (e.g., at gas plenum 110) or upon being emitted from the device 100 (e.g., as the gas is emitted from the gas orifice 134) may be selected from the group consisting of: (i)<1 bar; (ii) 1-2 bar; (iii) 2-3 bar; (iv) 3-4 bar; (v) 4-5 bar; (vi) 5-6 bar; (vii) 6-7 bar; and (viii)>7 bar.

A voltage supply may be arranged and adapted to apply a voltage to the device 100 to electrically charge solvent droplets emerging from the solvent capillary 150. The voltage supply may be arranged and adapted to apply a voltage to the solvent capillary 150, for example via an electrode arranged and adapted to contact the solvent capillary 150. The voltage supplied to the device 100 and/or solvent capillary 150 may be selected from the group consisting of: (i)<500 V; (ii) 0.5-1 kV; (iii) 1-1.5 kV; (iv) 1.5-2 kV; (v) 2-2.5 kV; (vi) 2.5-3 kV; (vii) 3-3.5 kV; (viii) 3.5-4 kV; (ix) 4-4.5 kV; (x) 4.5-5 kV; and (xi)>5 kV.

In various embodiments, there is provided an ambient ionisation source, for example a desorption electrospray ionisation ("DESI") ion source comprising the device 100. In one particular version the outer diameter 172 of the solvent capillary 150 may be about 360 μm, which may taper to a diameter of about 20 μm at the second end 171. The diameter of the gas orifice 134 may be about 400 μm and the solvent capillary 150 may protrude from the first nozzle 130 a distance 176 equal to about 1 mm. This leaves a gap 136 of about 20 μm between the solvent capillary 150 and the orifice 134.

As discussed herein, in may be beneficial to ensure that the solvent capillary 150 is centralised with respect to the gas orifice 134, and this may be achieved through the use of the centering disc 160 and/or capillary support 152.

This feature of the device 100 may be seen as beneficial in its own right, and so aspects of the disclosure may be directed to an apparatus comprising a first ion source comprising the device 100, wherein the first ion source may be arranged and adapted to emit a spray of charged droplets, and a gas nozzle 130 and a liquid emitter (e.g., solvent capillary) 150 extending through and protruding from the gas nozzle 130. In use, gas may exit the gas nozzle 130 around the liquid emitter 150 to nebulise liquid emerging from the liquid emitter 150 and produce the spray of charged droplets. The liquid emitter may be held within the gas nozzle 130 such that the liquid emitter 150 may be centralised or coaxial with respect to the gas nozzle 130.

A support member (e.g., centering disc 160) may be arranged and adapted to fit within the gas nozzle 130, wherein the support member 160 may comprise an aperture centralised or coaxial with respect to the gas nozzle 130, and the liquid emitter 150 may pass through the aperture.

An interference fit may exist between the support member 160 and the liquid emitter 150. Alternatively, a tubular member (e.g., capillary support 152) may be provided and comprise an elongated portion 156 that may be centralised or coaxial with respect to the gas nozzle 130, wherein the liquid emitter 150 may pass through the elongated portion 156. An interference fit may exist between the elongated portion 156 of the tubular member 152 and the liquid emitter 150, and also between the elongated portion 156 of the tubular member 152 and the support member 160.

The liquid emitter 150 may be held within the gas nozzle 130 (e.g., by the support member 160 and/or the tubular member 152) such that the radial distance or gap between the liquid emitter 150 and the gas nozzle 130 may be substantially constant around a circumference of the liquid emitter 150.

The features discussed herein, including the positions of the various components of the device 100 and/or the variation of certain mechanical and operational parameters, can provide a charged droplet sprayer that has a controllable range of spot sizes on the surface of a sample (e.g., a tissue section). The spot size of the spray of charged droplets may range from about 20 μm to about 500 μm, which may include comparable scaling of ion intensities of the molecular signal.

For example, using a control system to remotely control gas and solvent flows, predetermined spray parameters relating to predetermined spot sizes can be automatically set, which may allow the spot size to be chosen to complement the experiment being carried out in real time.

The device 100 may be reproducible, for example due to a consistent or fixed design, which may be embodied in multiple devices 100 in the same production line.

As discussed above the solvent capillary 150 may be positioned centrally within the gas orifice, for example using the centering disc 160 and/or capillary support 152. This can ensure a consistent gap 136 around the circumference of the solvent capillary 150, which in turn can lead to a consistent gas flow through the gap 136.

In addition, the second portion 156 of the capillary support 152 may act as a guide tube for the solvent capillary 150, and can reduce or eliminate vibration during use, for example caused by gas flow around the solvent capillary 150.

The inner portion 108 and/or the outer portion 106 of the nozzle housing may be rotatable within or with the first outer housing portion 102. Similarly, the outer capillary housing 122 may be rotatable within or with the second outer housing portion 106. One or more actuators (not shown) may be arranged and adapted to cause the rotation of the inner portion 108 and/or outer portion 106 of the nozzle housing, and/or the outer capillary housing 122. Alternatively, this may be achieved by manual adjustment. The voltage supply may be connected to the device 100 (e.g., the solvent capillary 150) via e.g., a brush or spring contact to allow the various parts of the device 100 to rotate as described above.

The solvent capillary 150 may protrude from the first nozzle 130 a distance 176, which may be adjustable in steps of less than about 0.5 mm, 0.4 mm, 0.3 mm, 0.2 mm, 0.1 mm, 50 μm, 40 μm, 30 μm, 20 μm or 10 μm. The actuator may be arranged and adapted to adjust the distance 176 that the solvent capillary 150 protrudes from the first nozzle 130 in increments of less than about 0.5 mm, 0.4 mm, 0.3 mm, 0.2 mm, 0.1 mm, 50 μm, 40 μm, 30 μm, 20 μm or 10 μm.

The nebulising gas may be taken from a gas supply for a mass spectrometer. Optimum gas flow rates may be within the pressure range of a mass spectrometer instrument, such that the gas can be used and controlled automatically.

A first ion source (e.g., first ion source 10) may comprise the gas nozzle 130 and a liquid (e.g., solvent) emitter corresponding to the solvent capillary 150 may extend through the gas nozzle 130, wherein, in use, gas exits the gas nozzle 130 around the liquid emitter 150 to nebulise liquid emerging from the liquid emitter 150. The one or more parameters of the first ion source may comprise a position of the liquid emitter 150 with respect to the gas nozzle 130. The one or more parameters of the first ion source may comprise a distance that the liquid emitter 150 protrudes from the gas nozzle 130, wherein the position or distance may be adjustable such that adjustment of the position or distance can be used to control the one or more spatial properties of the spray of charged droplets.

One or more actuators may be arranged and adapted to vary or adjust a mechanical parameter of the first ion source to control the one or more spatial properties of the spray of charged droplets. For example, an actuator could be provided that moves the liquid emitter (e.g., solvent capillary) 150 along its longitudinal axis, which is also the longitudinal axis of the gas nozzle 130. Such an actuator would be arranged and adapted to adjust the distance that the liquid emitter 150 protrudes from the gas nozzle 130.

The one or more spatial properties of the spray of charged droplets comprises an absolute position, relative position or offset position of the spray of charged droplets, which may be affected by a mechanical movement of one or more of the features of the apparatus shown in respect of FIGS. 4A-4C. The mechanical parameter of the first ion source may comprise a position of one or more nozzles or emitters for emitting at least a portion of the spray of charged droplets, for example the liquid emitter or solvent capillary 150, or the gas nozzle 130. The one or more actuators may be arranged and adapted to move the one or more nozzles or emitters, for example the liquid emitter or solvent capillary 150, or the gas nozzle 130, to control the one or more spatial properties of the spray of charged droplets.

A sampling stage may be provided and may be opposed to the device 100, such that the spray of charged droplets emerging from the device 100 impacts upon the sampling stage. The sampling stage may be arranged and adapted to receive a sample the device 100 may be direct the spray of charged droplets at the sample. One or more actuators may be arranged and adapted to adjust a position of the device 100 relative to the sample and/or sampling stage to control one or more spatial properties of the spray of charged droplets, as described herein.

In order to understand some of the modes of operation occurring with the devices for emitting a spray of charged droplets disclosed herein (e.g., an ambient ionisation source such as a desorption electrospray ionisation ("DESI") ion source), a computational fluid dynamic ("CFD") simulation was conducted.

Experimental gas flows at a range of pressures were compared to values derived from the simulation and a strong correlation was achieved between the experimental and simulated values.

Figure 5A:
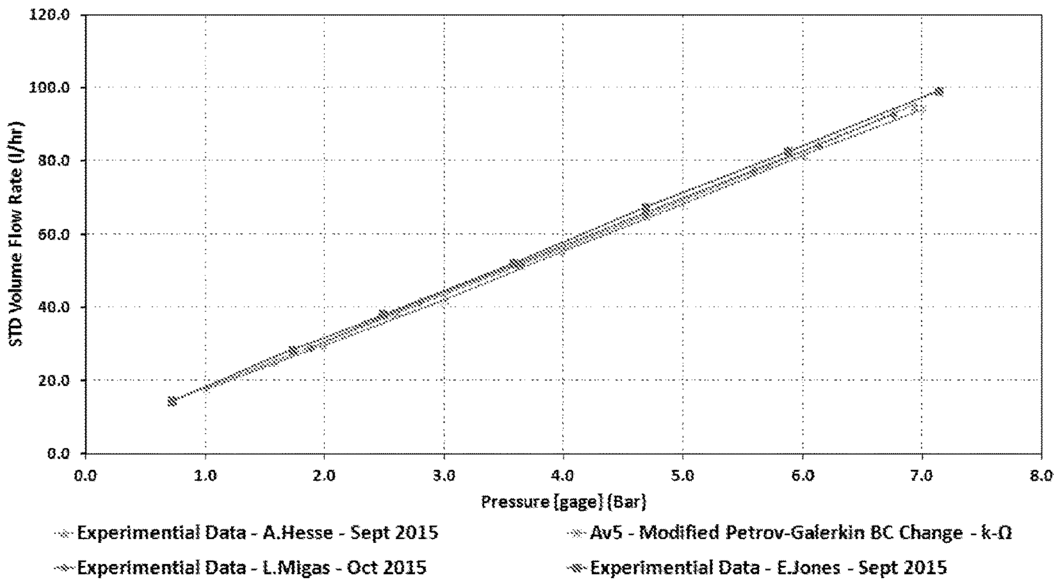
FIG. 5A shows a graph of the difference between simulated flow analysis data and experimental flow analysis data.

FIG. 5A shows a graph of nebulising gas flow rate vs. nebulising gas pressure through a desorption electrospray ionisation ("DESI") ion source. The nebulising gas was nitrogen and was measured using an inline Cole-Palmer mass flow meter operating at 3-300 l/hr. The results show an accuracy of +/−0.8% of reading +/−0.2% full scale (Waters Ctr #4521). Three sets of data were recorded at different times. One set of data is the average of five tests ("Av5").

The CFD simulations were used to model the behaviour of the nebulising gas at a surface 2 mm distant from the emitter (which may correspond to a typical experimental setup). To give an example, in some models the simulation showed two distinct flow fields at the target surface, which may be referred to as centripetal and centrifugal.

Figure 5B:
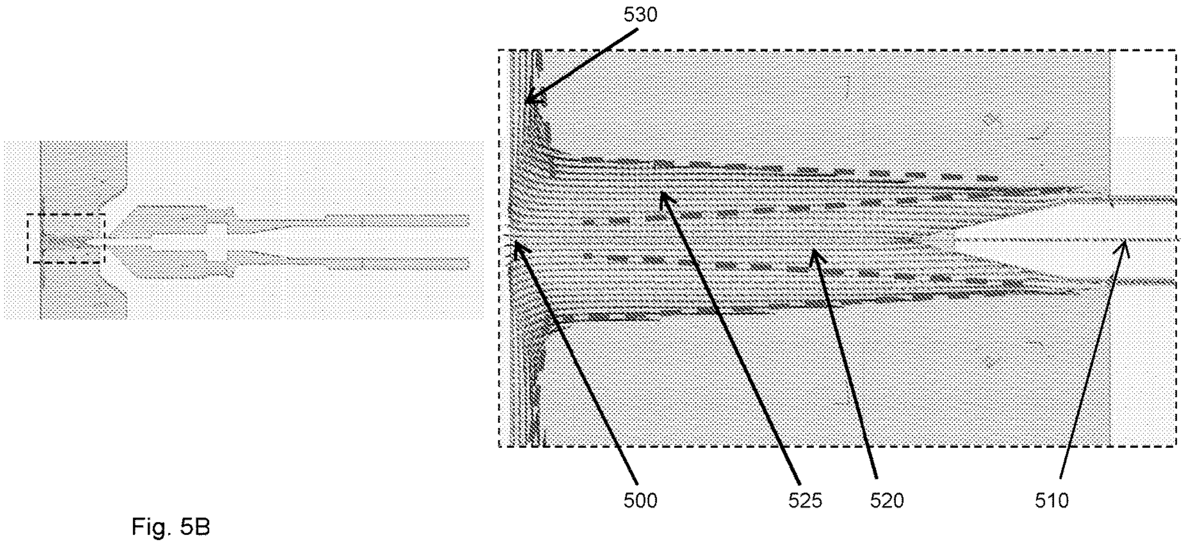
FIG. 5B is an illustration of the gas flow distribution around the solvent emitter tip created by the simulations.

FIG. 5B shows an illustration of the gas flow distribution around the solvent emitter tip created by the CFD simulations. A centre or stagnation point 500 can be seen which is in line with the longitudinal axis 510 of the device 100. A core 520 of the spray is located at the centre, and a mixing layer 525 located around the core 520. The spray may impinge upon the target surface and at least some of the spray may exit laterally, along a wall jet 530.

Figure 6A:
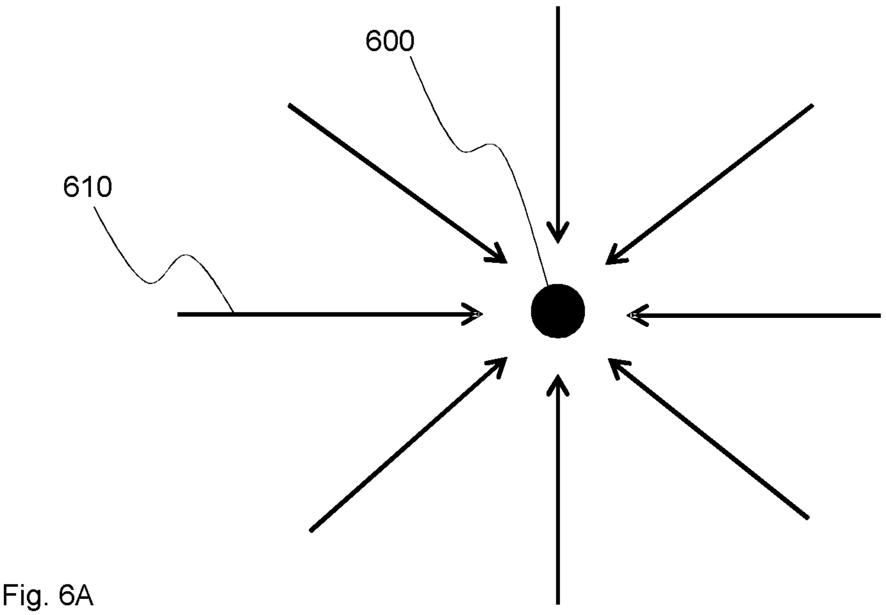
FIG. 6A shows schematically a flow pattern considered to be centrifugal.

FIG. 6A shows schematically a flow pattern that may be considered to be centrifugal, in which the flow (see flow lines 610) may be typically away from a centre point 600. The centre point may be located at a target surface.

Figure 6B:
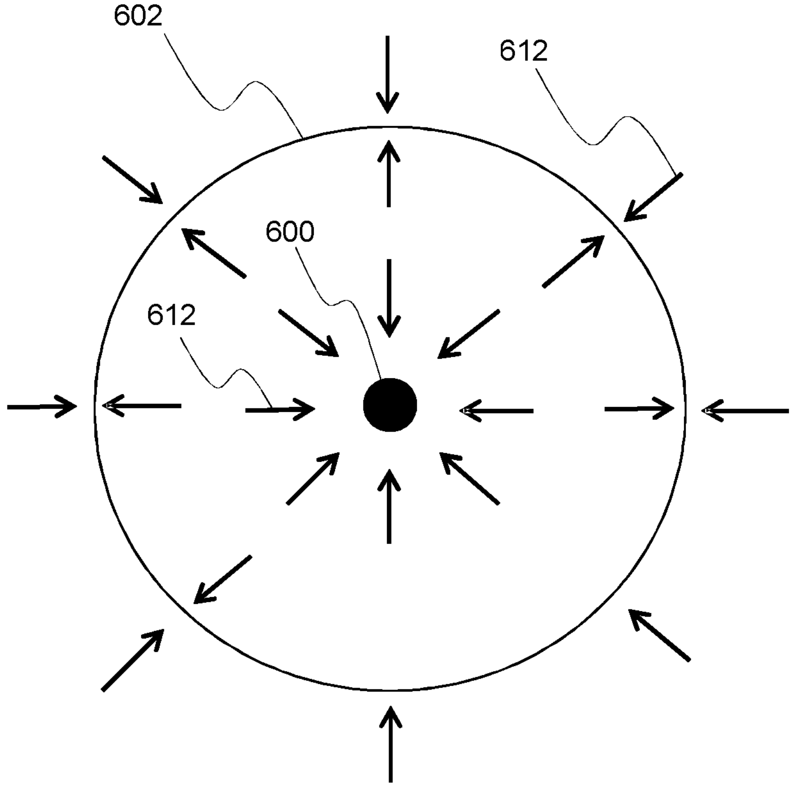
FIG. 6B shows schematically a flow pattern considered to be centripetal.

FIG. 6B shows schematically a flow pattern that may be considered to be centripetal, in which a stagnation line 602 may be defined, and the flow may be typically towards a centre point 600 (which may be located at a target surface) when moving towards the centre point 600 from the stagnation line 602 (see flow lines 612), and the flow may be typically away from the centre point 600 when moving away from the centre point 600 from the stagnation line 602 (see flow lines 614).

It can be assumed that the spray of charged droplets being emitted from an ambient ionisation source, for example a desorption electrospray ionisation ("DESI") ion source, follow a centripetal or centrifugal flow pattern. As discussed herein, the mechanical and/or operational parameters of such an ion source, for example those of a device 100 as described above, may be varied or adjusted to control the spot size of a spray of charged droplets in accordance with various embodiments.

For example, the flow pattern of a spray of charged droplets may be alternated between various centripetal or centrifugal flow patterns, and this may be achieved by varying the flow rates of the nebulising gas. Various embodiments are contemplated in which other mechanical and/or operational parameters may be varied or adjusted to control the spot size, in addition or alternatively to the variation of the flow rate of the nebulising gas.

By varying the flow rate of the nebulising gas, it may be possible to vary the spot size between a large and small spot size at the surface of the target. For example, the spot size may be varied between a spot size greater than about 500 μm diameter, and a spot size smaller than 100 μm diameter, which figures may be representative of the sampling area for a desorption electrospray ionisation ("DESI") experiment.

FIGS. 7A-7D show an example of how the gas flow distribution or flow field between a charged particle sprayer tip (e.g., a desorption electrospray ionisation ("DESI") sprayer tip) and a target surface may vary upon variation of a parameter, in this case the supply pressure of the nebulising gas. FIGS. 7A-7D have been produced using CFD simulation and, as discussed above, are representative of the type of flow exhibited by experimental setups using charged particle sprayers.

Figure 7A:
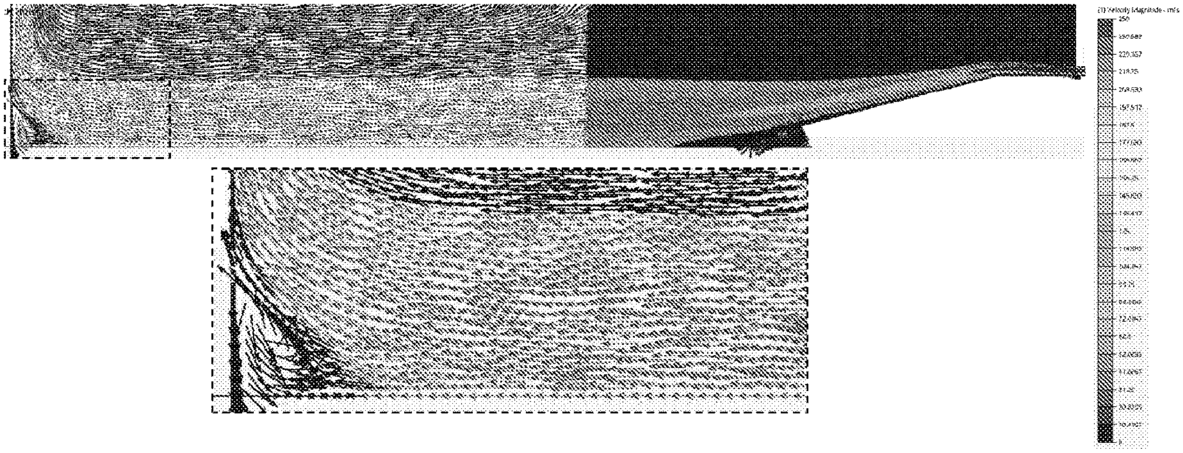
FIG. 7A shows an example of a simulated gas flow distribution or flow field between a Desorption Electrospray Ionisation ("DESI") sprayer tip and a target surface when the nebulising gas is supplied at a pressure of 1 bar.

FIG. 7A shows a flow field observed at a nebulising gas pressure of 1 bar (100 kPa), and may be representative of the type of flow observed between nebulising gas pressures of 1-3 bar (100-300 kPa). As will be appreciated, this flow can be described as centripetal flow. When using these pressures a rotating vortex flow regime may form on the target (or impingement) surface about the centre (or stagnation) point, and can be described as a recirculation bubble that exhibits centripetal motion at the target surface.

Figure 7B:
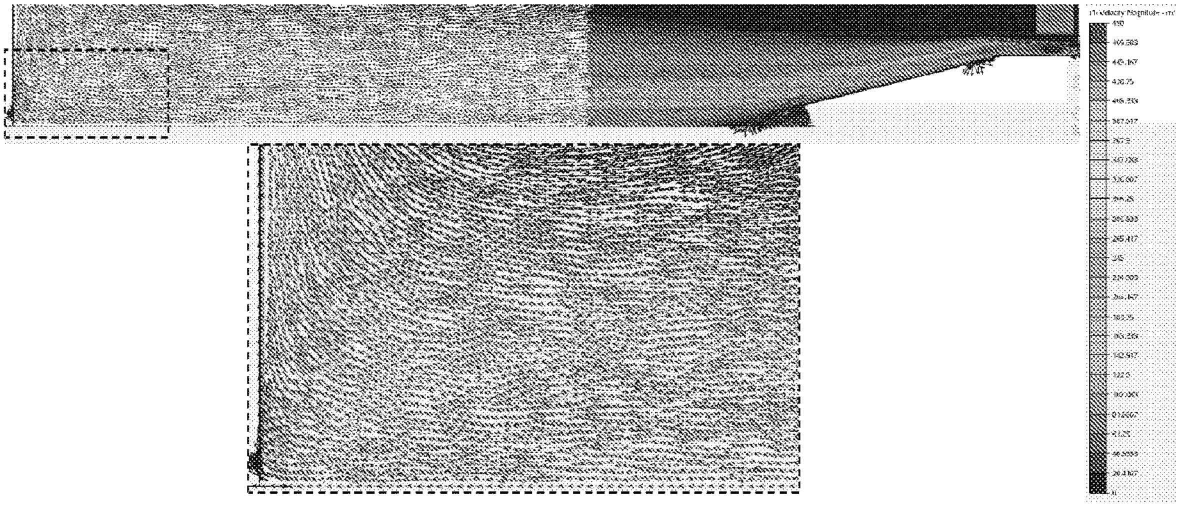
FIG. 7B shows an example of a simulated gas flow distribution or flow field between the same Desorption Electrospray Ionisation ("DESI") sprayer tip and target surface of FIG. 7A when the nebulising gas is supplied at a pressure of 4 bar.

FIG. 7B shows a flow field observed at a nebulising gas pressure of 4 bar (400 kPa) and it can be observed that the flow has transitioned from centripetal to centrifugal flow when observed at the target surface. The gas from the sprayer nozzle may hit the target surface and move radially away from the centre (or stagnation) point, e.g., into the so-called "wall jet region".

Figure 7C:
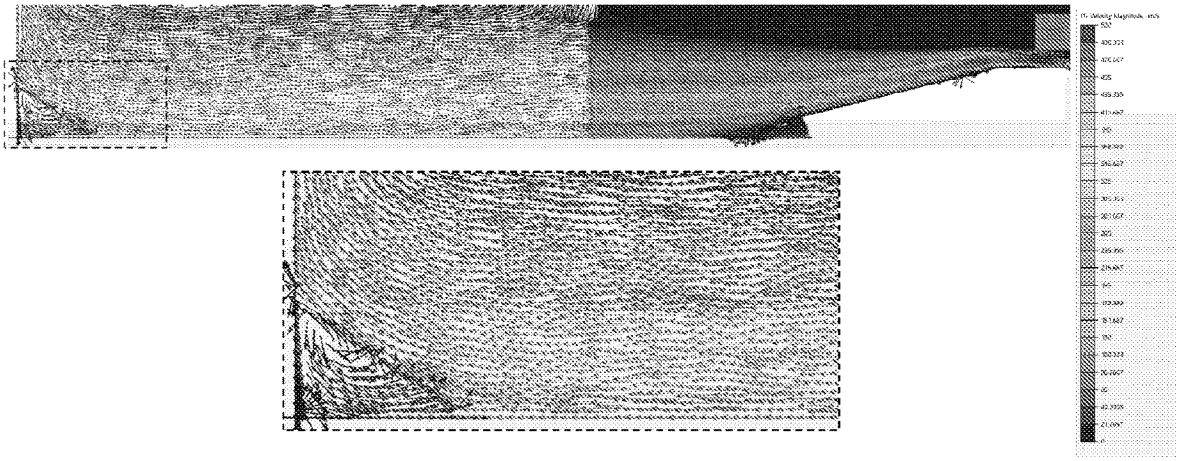
FIG. 7C shows an example of a simulated gas flow distribution or flow field between the same Desorption Electrospray Ionisation ("DESI") sprayer tip and target surface of FIGS. 7A and 7B when the nebulising gas is supplied at a pressure of 5 bar.

FIG. 7C shows a field flow observed at a nebulising gas pressure of 5 bar (500 kPa) and it can be observed that the flow has transitioned back from centrifugal flow to centripetal flow at the target surface.

Figure 7D:
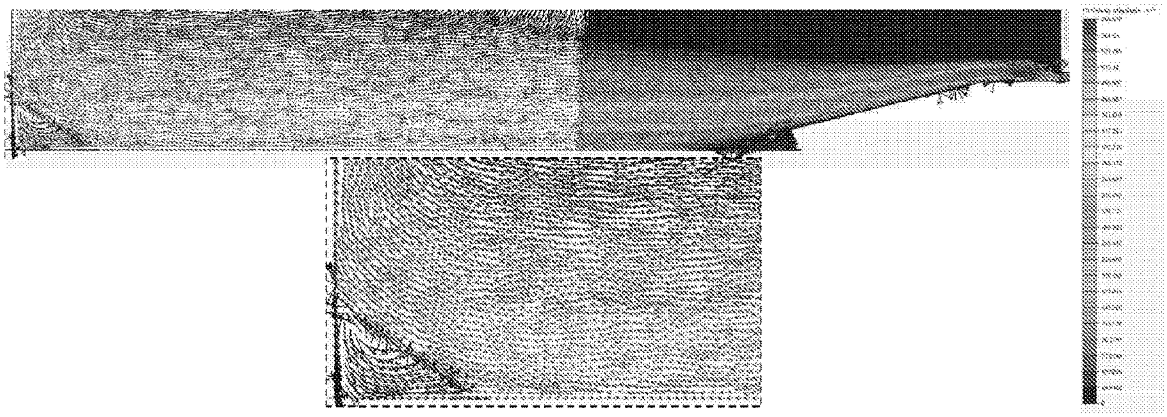
FIG. 7D shows an example of a simulated gas flow distribution or flow field between the same Desorption Electrospray Ionisation ("DESI") sprayer tip and target surface of FIGS. 7A, 7B and 7C when the nebulising gas is supplied at a pressure of 7 bar.

FIG. 7D shows a field flow observed at a nebulising gas pressure of 7 bar (700 kPa) and it can be observed that the flow has remained centripetal at the target surface.

It can be concluded that a centrifugal flow of charged droplets may generally lead to a larger spot size than a centripetal flow of charged droplets. Droplets may generally move towards the central or stagnation point during a centripetal flow regime, and may generally move away from the central or stagnation point during a centrifugal flow regime. A centripetal flow may result in a more focused spray of charged droplets on the target or impingement surface. Since the nebulising gas pressure has been shown to directly affect the flow of charged droplets, and ultimately the spot size of the spray of charged droplets on the target surface, it follows that an operator or control system may control the spot size of the spray of charged droplets by varying or adjusting the nebulising gas pressure.

Alternatively, or additionally, mechanical and/or operational parameters other than the nebulising gas pressure may be varied or adjusted to control the spot size of the spray of charged droplets. For example, if variation or adjustment of the parameter(s) in question leads to a determinable variation in the spot size of the spray of charged droplets, then this or these parameters may be used to control the spot size of the spray of charged droplets.

It will be appreciated that a range of spot sizes of the spray of charged droplets may be achievable by variation or adjustment of one or more mechanical and/or operational parameters. The one or more mechanical and/or operational parameters could be varied between upper and lower limits, and the spot size of the spray of charged droplets could be recorded at each parameter value. A control system may be provided that adjusts or varies the one or more parameters to provide a particular or desired spot size, for example as determined by varying the one or more parameters between upper and lower limits.

For example, the flow rate (or pressure) of solvent may be varied, alternatively or in addition to the flow rate of the nebulising gas and/or other mechanical and/or operational parameters. The effect of varying the flow rate of the solvent with regard to the spot size of the spray of charged droplets may be the same as or similar to that of varying the nebulising gas. Variation of the solvent flow rate may lead to changes in the flow field between the charged particle sprayer tip (e.g., a desorption electrospray ionisation ("DESI") sprayer tip) and a target surface, which changes may lead to a variation in the spot size of the spray of charged droplets at the target surface.

In an example of a mechanical variation, the distance that the solvent nozzle (e.g., solvent nozzle 170 in FIGS. 4A-4C) protrudes from the nebulising gas nozzle (e.g., gas nozzle 130 in FIGS. 4A-4C) may be adjustable, for example using a control system and a suitable actuator operatively connected to the solvent gas nozzle. This adjustment may lead to a determinable variation in the spot size of the spray of charged droplets, and may be used to control the spot size of the spray of charged droplets.

The actuator may be a stepper motor and/or may be arranged and adapted to adjust the distance that the solvent nozzle protrudes from the nebulising gas nozzle in increments, for example increments of less than about 0.5 mm, 0.4 mm, 0.3 mm, 0.2 mm, 0.1 mm, 50 μm, 40 μm, 30 μm, 20 μm or 10 μm. The spot size of the spray of charged droplets may be recorded at each increment, such that each increment may be associated with a given spot size. Alternatively, or additionally, the variation in the spot size between increments may be recorded, and this information may be used to increase or decrease the spot size.

Other mechanical variations are contemplated, for example a sample or sample stage may be provided in combination with the device for emitting a spray of charged droplets as part of an experimental apparatus. The position of the sampling stage (or sample) relative to the device may be adjustable. One or more actuators may be provided to adjust the position of the sampling stage and/or device, so as to control the spot size of the spray of charged droplets (or other spatial parameter of the spray). The adjustment may be of the distance between the sampling stage (or sample) and the device for emitting a spray of charged droplets.

Figure 8A:
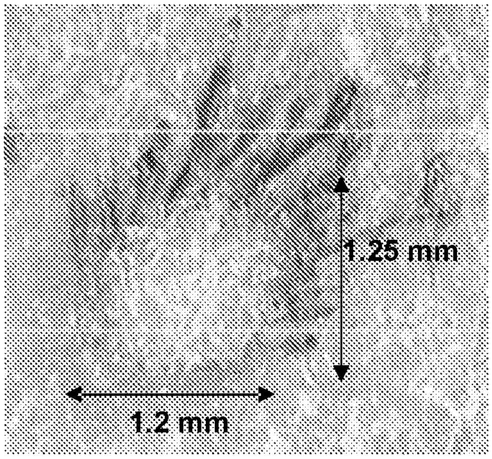
FIG. 8A shows a relatively large spot size of spray of charged droplets from a Desorption Electrospray Ionisation ("DESI") sprayer.
Figure 8B:
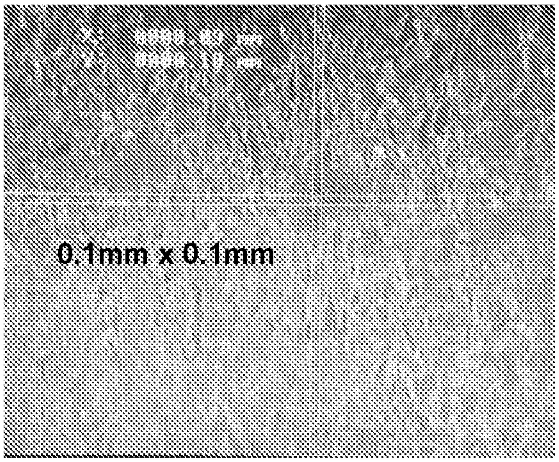
FIG. 8B shows a relatively small spot size of spray of charged droplets from a Desorption Electrospray Ionisation ("DESI") sprayer.

In various embodiments a plurality of different parameters may be adjusted or varied to control the spot size of the spray of charged droplets. The effect of the different parameters on the spot size may be determined, and this information may be used to provide a range of spot sizes for the spray of charged droplets. For example, the parameters, e.g., flow rates (or pressure) of the nebulising gas and the solvent, may be varied between upper and lower limits. The spot size of the spray of charged droplets may be recorded at each value of nebulising gas and solvent flow rate. A control system could be provided that adjusts the plurality of different parameters to provide a particular spot size, for example as determined by varying the parameters between upper and lower limits. FIGS. 8A and 8B illustrate the effect that can be achieved by varying a plurality of different parameters, in this case the nebulising gas flow and the solvent flow. As can be seen in FIG. 8A, a relatively large spot size is produced having a diameter of about 1.2 mm, with certain values of nebulising gas flow and the solvent flow. FIG. 8B shows the effect of adjusting only the nebulising gas flow and the solvent flow, which leads to a spot size being produced with a diameter of about 0.1 mm.

No physical modification to the hardware may be necessary to achieve a reduction in spot size of the spray of charged droplets for various embodiments disclosed herein, which can allow the spot size of the spray of charged droplets (i.e., the analysis area on the surface of the sample) to be carefully controlled by varying or adjusting instrumental parameters (e.g., mechanical and/or operational parameters) as described herein. Various embodiments disclosed herein can lead to improvements in data quality, since the spot size of the analysis can be set by a user (e.g., using the control system) to match the experiment at hand.

The device for emitting a spray of charged droplets as disclosed herein may, in various embodiments, have a design that can eliminate many of the concerns that relate to conventional devices, for example in the field of desorption electrospray ionisation ("DESI") sprayers. The devices disclosed herein can provide robust and reproducible analysis conditions between different devices (e.g., on different instruments or in different labs, etc.) which may facilitate global applicability of data obtained from any given laboratory.

Various embodiments are described and envisaged in which a control system may be able to switch between spot sizes when conducting data directed imaging ("DDI").

In such embodiments, the control system may be arranged and adapted to identify one or more regions of interest of a sample by surveying the sample at a first resolution, for example by directing a spray of charged droplets onto a sample when the spray has a first cross-sectional area at a point of impact with the sample. During this survey scan the control system may control the spot size of the spray of charged droplets by adjusting or varying the one or more parameters, so as to provide a spot size having the first cross-sectional area.

The control system may be further arranged and adapted to analyse the one or more regions of interest at a second, different resolution by directing the spray of charged droplets onto the sample when the spray has a second different cross-sectional area at a point of impact with the sample. During this analytical scan the control system may control the spot size of the spray of charged droplets by adjusting or varying the one or more parameters, so as to provide a spot size having the second cross-sectional area.

The second cross-sectional area may be smaller than the first cross-sectional area, such that the survey scan may be used to obtain a mass spectral image at relatively low resolution (i.e. with relatively large average spacing between adjacent target regions) in order to identify areas of interests within the tissue sample, and the subsequent analytical scan of the areas of interest may be performed with reduced target region spacing to obtain high-resolution mass spectral imaging of the areas of interest.

The first and/or second cross-sectional area may be selected from the group consisting of: (i)<100 $\mu m^2$; (ii) 100-200 $\mu m^2$; (iii) 200-500 $\mu m^2$; (iv) 500-1000 $\mu m^2$; (v) 1000-2000 $\mu m^2$; (vi) 2000-5000 $\mu m^2$; (vii) 5000-10000 $\mu m^2$; (viii) 10000-20000 $\mu m^2$; (ix) 20000-40000 $\mu m^2$; (x) 40000-60000 $\mu m^2$; (xi) 60000-80000 $\mu m^2$; (xii) 80000-100000 $\mu m^2$; (xiii) 0.1-0.2 $mm^2$; (xiv) 0.2-0.4 $mm^2$; (xv) 0.4-0.6 $mm^2$; (xvi) 0.6-0.8 $mm^2$; (xvii) 0.8-1 $mm^2$; (xviii) 1-1.2 $mm^2$; (xix) 1.2-1.4 $mm^2$; (xx) 1.4-1.6 $mm^2$; (xxi) 1.6-1.8 $mm^2$; (xxii) 1.8-2 $mm^2$; and (xxiii)>2 $mm^2$.

Various different embodiments relating to methods of analysis, e.g., methods of medical treatment, surgery and diagnosis and non-medical methods, are contemplated. According to some embodiments the methods disclosed above may be performed on in vivo, ex vivo or in vitro tissue sample. The tissue may comprise human or non-human animal or plant tissue. Other embodiments are contemplated wherein the target or sample may comprise biological matter or organic matter (including a plastic). Embodiments are also contemplated wherein the target or sample comprises one or more bacterial colonies or one or more fungal colonies.

Various embodiments are contemplated wherein analyte ions generated by an ambient ionisation ion source are then subjected either to: (i) mass analysis by a mass analyser or filter such as a quadrupole mass analyser or a Time of Flight mass analyser; (ii) ion mobility analysis (IMS) and/or differential ion mobility analysis (DMA) and/or Field Asymmetric Ion Mobility Spectrometry (FAIMS) analysis; and/or (iii) a combination of firstly (or vice versa) ion mobility analysis (IMS) and/or differential ion mobility analysis (DMA) and/or Field Asymmetric Ion Mobility Spectrometry (FAIMS) analysis followed by secondly (or vice versa) mass analysis by a mass analyser or filter such as a quadrupole mass analyser or a Time of Flight mass analyser. Various embodiments also relate to an ion mobility spectrometer and/or mass analyser and a method of ion mobility spectrometry and/or method of mass analysis. Ion mobility analysis may be performed prior to mass to charge ratio analysis or vice versa.

Various references are made in the present application to mass analysis, mass analysers or filters, mass analysing, mass spectrometric data, mass spectrometers and other related terms referring to apparatus and methods for determining the mass or mass charge of analyte ions. It should be understood that it is equally contemplated that the present invention may extend to ion mobility analysis, ion mobility analysers, ion mobility analysing, ion mobility data, ion mobility spectrometers, ion mobility separators and other related terms referring to apparatus and methods for determining the ion mobility, differential ion mobility, collision cross section or interaction cross section of analyte ions. Furthermore, it should also be understood that embodiments are contemplated wherein analyte ions may be subjected to a combination of both ion mobility analysis and mass analysis i.e. that both (a) the ion mobility, differential ion mobility, collision cross section or interaction cross section of analyte ions together with (b) the mass to charge of analyte ions is determined. Accordingly, hybrid ion mobility-mass spectrometry (IMS-MS) and mass spectrometry-ion mobility (MS-IMS) embodiments are contemplated wherein both the ion mobility and mass to charge ratio of analyte ions generated e.g. by an ambient ionisation ion source are determined. Ion mobility analysis may be performed prior to mass to charge ratio analysis or vice versa. Furthermore, it should be understood that embodiments are contemplated wherein references to mass spectrometric data and databases comprising mass spectrometric data should also be understood as encompassing ion mobility data and differential ion mobility data etc. and databases comprising ion mobility data and differential ion mobility data etc. (either in isolation or in combination with mass spectrometric data).

Various surgical, therapeutic, medical treatment and diagnostic methods are contemplated.

However, other embodiments are contemplated which relate to non-surgical and non-therapeutic methods of mass spectrometry and/or ion mobility spectrometry which are not performed on in vivo tissue. Other related embodiments are contemplated which are performed in an extracorporeal manner such that they are performed outside of the human or animal body.

Further embodiments are contemplated wherein the methods are performed on a non-living human or animal, for example, as part of an autopsy procedure.

Although the present invention has been described with reference to preferred embodiments, it will be understood by those skilled in the art that various changes in form and detail may be made without departing from the scope of the invention as set forth in the accompanying claims.

The invention claimed is:

1. An apparatus comprising:

a first ion source arranged and adapted to emit a spray of charged droplets;

a sensor arranged and adapted to measure one or more spatial properties of said spray of charged droplets throughout an acquisition; and a control system arranged and adapted to control said one or more spatial properties of said spray of charged droplets in use by automatically varying or adjusting one or more parameters of said first ion source, wherein the control system is configured to determine a suitable value of said one or more spatial properties, and adjust or vary said one or more parameters of said first ion source during the acquisition when a value of said one or more spatial properties measured by said sensor differs from the suitable value by a given amount.

2. An apparatus as claimed in claim 1, wherein said first ion source comprises a desorption electrospray ionisation ("DESI") ion source or a desorption electro-flow focusing ("DEFFI") ion source.

3. An apparatus as claimed in claim 1, wherein said control system is arranged and adapted to automatically vary or adjust said one or more parameters of said first ion source, in real time and/or during the acquisition, such that said spray of charged droplets transitions from having a first value of said one or more spatial properties to having a second, different value of said one or more spatial properties, wherein the second value corresponds to the determined suitable value.

4. An apparatus as claimed in claim 1, wherein said control system is arranged and adapted to:

determine a value of said one or more parameters of said first ion source that achieves a desired spatial property; and automatically vary or adjust said one or more parameters of said first ion source until the value of said one or more parameters corresponds to the determined value so as to control one or more spatial properties of said spray of charged droplets.

5. An apparatus as claimed in claim 4, wherein said determining a value of said one or more parameters of said first ion source that achieves a desired spatial property comprises:

varying said one or more parameters between a plurality of different parameter values and recording a value of said one or more spatial properties at each parameter value; and determining which of the plurality of different parameter values corresponds to or achieves the desired spatial property.

6. An apparatus as claimed in claim 4, wherein said control system is arranged and adapted to carry out said step of determining a value of said one or more parameters of said first ion source that achieves a desired spatial property as part of a calibration routine.

7. An apparatus as claimed in claim 1, wherein said first ion source comprises a gas nozzle and a liquid emitter extending through said gas nozzle, wherein, in use, gas exits said gas nozzle around said liquid emitter to nebulise liquid emerging from said liquid emitter.

8. An apparatus as claimed in claim 7, wherein said one or more parameters of said first ion source comprises a position of said liquid emitter with respect to said gas nozzle.

9. An apparatus as claimed in claim 1, further comprising one or more actuators arranged and adapted to vary or adjust a mechanical parameter of said first ion source to control said one or more spatial properties of said spray of charged droplets.

10. An apparatus as claimed in claim 1, wherein the control system is arranged and adapted:

to conduct a survey scan of a sample and identify one or more regions of interest of said sample, wherein during said survey scan said one or more parameters of said ion source are adjusted such that the spray of charged droplets has a relatively large cross-sectional area; and to conduct an analytical scan of said regions of interest, wherein during said analytical scan said one or more parameters of said ion source are adjusted such that the spray of charged droplets has a relatively small cross-sectional area.

11. A mass spectrometer or an ion mobility spectrometer comprising an apparatus as claimed in claim 1.

12. A method comprising:

using a first ion source to emit a spray of charged droplets;

using a sensor to measure one or more spatial properties of said spray of charged droplets throughout an acquisition; and controlling one or more spatial properties of said spray of charged droplets by automatically varying or adjusting one or more parameters of said first ion source;

wherein the method comprises:

determining a suitable value of said one or more spatial properties; and adjusting or varying said one or more parameters of said first ion source during the acquisition when a value of said one or more spatial properties measured by said sensor differs from the suitable value by a given amount.

13. A method as claimed in claim 12, further comprising:

determining a value of said one or more parameters of said first ion source that achieves a desired spatial property; and automatically varying or adjusting said one or more parameters of said first ion source until the value of said one or more parameters corresponds to the determined value so as to control one or more spatial properties of said spray of charged droplets.

14. A method as claimed in claim 12, further comprising:

conducting a survey scan of a sample and identifying one or more regions of interest of said sample, and adjusting said one or more parameters of said ion source during said survey scan such that the spray of charged droplets has a relatively large cross-sectional area; and conducting an analytical scan of said regions of interest, and adjusting said one or more parameters of said ion source during said analytical scan such that the spray of charged droplets has a relatively small cross-sectional area.

15. A method of mass spectrometry or ion mobility spectrometry comprising a method as claimed in claim 12.

16. An apparatus as claimed in claim 1, wherein said one or more parameters of said first ion source comprises one or more of: (i) a position of said first ion source; (ii) a height of said first ion source above a sample; and/or (iii) a flow rate or pressure of said spray of charged droplets.

17. An apparatus as claimed in claim 1, wherein said one or more parameters of said first ion source comprises a flow rate or pressure of said spray of charged droplets.

18. An apparatus as claimed in claim 1, wherein said one or more spatial properties of said spray of charged droplets comprises one or more of: (i) a geometry; (ii) a profile; (iii) a cross-sectional profile; (iv) an area; (v) a cross-sectional area; (vi) a shape; (vii) a symmetry; (viii) a diameter; (ix) a circumference; (x) a width; and/or (xi) a spot size of said spray of charged droplets.

19. An apparatus as claimed in claim 1, wherein said one or more spatial properties of said spray of charged droplets comprises a spot size of said spray of charged droplets.

* * * * *